US010742941B2

(12) United States Patent
Kyosuna et al.

(10) Patent No.: US 10,742,941 B2
(45) Date of Patent: Aug. 11, 2020

(54) PROJECTION DEVICE, PROJECTION METHOD, AND PROGRAM RECORDING MEDIUM

(71) Applicant: NEC CORPORATION, Tokyo (JP)

(72) Inventors: Satoshi Kyosuna, Tokyo (JP); Hirofumi Tsuda, Tokyo (JP); Fujio Okumura, Kanagawa (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/461,866

(22) PCT Filed: Nov. 20, 2017

(86) PCT No.: PCT/JP2017/041598
§ 371 (c)(1),
(2) Date: May 17, 2019

(87) PCT Pub. No.: WO2018/101097
PCT Pub. Date: Jun. 7, 2018

(65) Prior Publication Data
US 2020/0004115 A1 Jan. 2, 2020

(30) Foreign Application Priority Data
Nov. 30, 2016 (JP) ................. 2016-232800

(51) Int. Cl.
*H04N 9/31* (2006.01)
*G03B 21/00* (2006.01)
(Continued)

(52) U.S. Cl.
CPC ....... *H04N 9/3182* (2013.01); *G02B 27/0018* (2013.01); *G03B 21/005* (2013.01);
(Continued)

(58) Field of Classification Search
CPC .... G02B 26/06; G02B 27/0018; G02B 27/48; G03H 1/2294; G03H 1/32; H04N 9/31;
(Continued)

(56) References Cited

U.S. PATENT DOCUMENTS 6,088,102 A * 7/2000 Manhart ................ G02B 26/02
356/499
8,382,289 B2 * 2/2013 Hikosaka ................. H04N 9/31
348/744

(Continued)

FOREIGN PATENT DOCUMENTS

JP 2005-091865 A 4/2005
JP 2010-245844 A 10/2010
(Continued)

OTHER PUBLICATIONS

Written Opinion for PCT/JP2017/041598, dated Jan. 9, 2018.
International Search Report for PCT/JP2017/041598, dated Jan. 9, 2018.

*Primary Examiner* — Bao-Luan Q Le
(74) *Attorney, Agent, or Firm* — Sughrue Mion, PLLC

(57) ABSTRACT

In order to make a ghost image appearing when projection light is projected using a phase-modulating spatial light modulation element difficult to visually recognize, a projection device includes a light source, a light-source driving means, a spatial light modulation element, a modulation element control means, a projection control means, and a projection optical system, wherein the projection control means controls the light-source driving means and the modulation element control means in such a way as to cause a phase distribution of an image including a ghost compensation image and a desired image to be displayed on a display part, the ghost compensation image being an image for which high brightness is set totally and in which a display information portion to be displayed on a projection (Continued)

surface is bright while a ghost image portion that appears in association with the display information is dark.

10 Claims, 23 Drawing Sheets

(51) Int. Cl.
 *G03B 21/14* (2006.01)
 *G02B 27/00* (2006.01)
 *G03H 1/22* (2006.01)
 *G02B 26/06* (2006.01)
(52) U.S. Cl.
 CPC ......... *G03B 21/142* (2013.01); *G03H 1/2294* (2013.01); *H04N 9/31* (2013.01); *G02B 26/06* (2013.01)
(58) Field of Classification Search
 CPC .. H04N 9/3182; H04N 9/3161; H04N 9/3164; G03B 21/2033
 See application file for complete search history.

(56) References Cited

U.S. PATENT DOCUMENTS

| | | | | |
|---|---|---|---|---|
| 8,427,507 B2* | 4/2013 | Uchida | ................ | H04N 9/3194 345/629 |
| 8,482,828 B2* | 7/2013 | Leister | ................ | G03H 1/0808 359/29 |
| 8,659,585 B2* | 2/2014 | Hikosaka | ............. | H04N 9/3182 345/207 |
| 8,807,762 B2* | 8/2014 | Uchiyama | ............ | H04N 9/3176 345/589 |
| 9,264,680 B2* | 2/2016 | Hasegawa | ............ | H04N 9/3182 |
| 9,778,477 B2* | 10/2017 | Aksyuk | ..................... | G03H 1/02 |
| 10,146,180 B2* | 12/2018 | Leister | ...................... | G02B 5/32 |
| 2008/0212040 A1* | 9/2008 | Aksyuk | .................. | G03B 33/12 353/99 |
| 2010/0118359 A1* | 5/2010 | Leister | ................. | G03H 1/0808 359/9 |
| 2010/0134643 A1* | 6/2010 | Koishi | .................... | G03B 29/00 348/222.1 |
| 2010/0177253 A1* | 7/2010 | Golub | ................ | G02B 27/0927 349/8 |
| 2010/0265403 A1* | 10/2010 | Hikosaka | .................. | H04N 9/31 348/607 |
| 2011/0018897 A1* | 1/2011 | Uchiyama | ............ | H04N 9/3176 345/619 |
| 2011/0063324 A1* | 3/2011 | Uchida | ................. | H04N 9/3179 345/633 |
| 2011/0169854 A1* | 7/2011 | Hikosaka | ............. | H04N 9/3182 345/589 |
| 2012/0320220 A1* | 12/2012 | Hasegawa | ............ | H04N 9/3182 348/177 |
| 2016/0004219 A1* | 1/2016 | Leister | ..................... | G02B 5/32 359/9 |
| 2016/0238833 A1* | 8/2016 | Okumura | ................ | G02B 26/06 |

FOREIGN PATENT DOCUMENTS

| | | |
|---|---|---|
| JP | 2010-533889 A | 10/2010 |
| JP | 2014-032338 A | 2/2014 |
| WO | 2015/049866 A1 | 4/2015 |

* cited by examiner

PROJECTION DEVICE, PROJECTION METHOD, AND PROGRAM RECORDING MEDIUM

This Application is a National Stage of International Application No. PCT/JP2017/041598 filed Nov. 20, 2017, claiming priority based on Japanese Patent Application No. 2016-232800 filed Nov. 30, 2016, the disclosure of which is incorporated herein in its entirety by reference.

TECHNICAL FIELD

The present invention relates to a projection device, a projection method, and a program. In particular, the present invention relates to a projection device including a phase-modulating spatial light modulation element, a projection method, and a program.

BACKGROUND ART

An interface device that includes a projector combined with a camera has been developed in recent years. Such an interface device captures a content of operation, by using a camera, performed by a user on an image projected from a projector, recognizes the content of operation on image data, and thereby achieves an interactive operation. PTL 1 discloses an interface device including a projector combined with a camera.

The interface device in PTL 1 includes an irradiation means that uses a phase-modulating spatial light modulation element. The interface device in PTL 1 forms a desired image on a projection surface by causing a phase distribution for forming the image to be displayed on a display surface of the spatial light modulation element and projecting light reflected from the display surface irradiated with light onto the display surface.

A projection image by a projector that uses a phase-modulating modulation element has several problems in terms of image quality. One of the problems is a ghost image (hereinafter referred to as a ghost) that appears in association with a desired image.

FIG. 25 illustrates an example in which a viewing image 100 is displayed on a projection surface by using projection light from a projector that uses a phase-modulating modulation element. The viewing image 100 includes an up-pointing arrow as desired display information 100D. Then, a first-order ghost 100G appears in a position in which the display information 100D is located when being rotated 180 degrees about a center point 100C (which is not displayed in reality) of the viewing image 100. Note that while a higher-order ghost also appears in a position at a distance of an integer multiple of a distance from the center point 100C of the viewing image 100 to the display information 100D, the higher-order ghost is omitted from FIG. 25. Appearance of the ghost 100G varies depending on performance of the phase modulation element, a definition of gamma transformation, temperature, and the like.

The ghost 100G is visually recognized when brightness thereof becomes about several percent of brightness of the display information 100D. Therefore, a technique for removing a ghost from a visually recognized image is demanded.

PTL 2 discloses a depth-of-field expanding system that is capable of removing a ghost and acquiring an image with an expanded depth of field. The system in PTL 2 rotates a pupil modulation element which performs modulation of a phase distribution on light from a subject, removes a ghost by using an intermediate image acquired as a result of the rotation, and acquires an image with an expanded depth of field.

PTL 3 discloses an image display device that alternately displays an image for the right eye and an image for the left eye, and thereby makes a stereoscopic image visually recognized. When there is a target region in which crosstalk occurs due to a large difference in luminance between an image for the right eye and an image for the left eye, the device in PTL 3 reduces influence of the crosstalk by making a tone correction to the target region and setting a gradation region around the target region.

CITATION LIST

Patent Literature

[PTL 1] International Publication No. WO 2015/049866
[PTL 2] Japanese Unexamined Patent Application Publication No. 2005-091865
[PTL 3] Japanese Unexamined Patent Application Publication No. 2014-032338

SUMMARY OF INVENTION

Technical Problem

The system in PTL 2 is capable of removing a ghost that overlaps on an image with an expanded depth of field which can be acquired under microscopic observation. However, the system in PTL 2 has a problem that a ghost formed in a position distant from an image, when the image is projected on a place in the distance by using the phase modulation element, cannot be removed. Further, in the system in PTL 2, the pupil modulation element needs to be mechanically driven and rotated in order to remove a ghost, and therefore the system has a problem that a driving mechanism for removing a ghost needs to be added.

The device in PTL 3 is capable of reducing an amount of crosstalk when two images are alternately visually recognized. However, in order to reduce a ghost that appear in a single image by using the device in PTL 3, an image including the ghost and an image for eliminating the ghost need to be made alternately visually recognized. A method in PTL 3 has a problem that eye glasses that mechanically operate are required in order to alternately visually recognize two images.

An object of the present invention is to solve the problems described above, and provide a projection device that makes a ghost image that appears when projection light is projected by using a phase-modulating spatial light modulation element difficult to visually recognize.

Solution to Problem

A projection device according to the present invention includes a light source, a light-source driving means for driving the light source, a spatial light modulation element that reflects light from the light source by a display part, a modulation element control means for causing a phase distribution of an image being projected onto a projection surface to be displayed on the display part, a projection control means for controlling the light source driving means and the modulation element control means, and a projection optical system that projects light reflected by the display part toward the projection surface, wherein the projection control means controls the light-source driving means and the modulation element control means in such a way as to cause a phase distribution of an image to be displayed on the display part, the image including a ghost compensation image for which high brightness is set totally and in which a display information portion to be displayed on the projection surface is bright while a ghost image portion that appears in association with the display information is dark, and a desired image.

A projection method according to the present invention is a projection method that uses a phase-modulating spatial light modulation element, and includes: when displaying a desired image on a projection surface, causing a phase distribution of an image to be displayed on a display part, the image including a ghost compensation image for which high brightness is set totally and in which a display information portion to be displayed on the projection surface is bright while a ghost image portion that appears in association with the display information is dark, and a desired image; causing light from a light source to be reflected by the display part of the spatial light modulation element; and projecting light reflected by the display part of the spatial light modulation element toward the projection surface.

A program according to the present invention is a program that uses a phase-modulating light modulation element and causes a computer to execute: when a desired image is displayed on a projection surface, processing of causing a phase distribution of an image to be displayed on a display part, the image including a ghost compensation image for which high brightness is set totally and in which a display information portion to be displayed on the projection surface is bright while a ghost image portion that appears in association with the display information is dark, and a desired image; processing of causing light from a light source to be reflected by the display part of the spatial light modulation element; and processing of projecting light reflected by the display part of the spatial light modulation element toward the projection surface.

Advantageous Effects of Invention

According to the present invention, a projection device that makes a ghost image that appears when projection light is projected by using a phase-modulating spatial light modulation element difficult to visually recognize can be provided.

EXAMPLE EMBODIMENT

Example embodiments for carrying out the present invention will be described below by using drawings. While technically preferable specifics for carrying out the present invention are provided in the example embodiments described below, they are not intended to limit the scope of the invention to the specifics provided below. Note that similar parts are given same reference signs throughout the drawings used for describing the following example embodiments, unless there is a particular reason. Further, repeated description of similar configurations and operations in the following example embodiments may be omitted. Furthermore, the directions of arrows in drawings are illustrated one example, and are not intended to limit the directions of signals and light.

First Example Embodiment (Configuration)

A configuration of a projection device according to a first example embodiment will be described first with reference to drawings.

Figure 1:
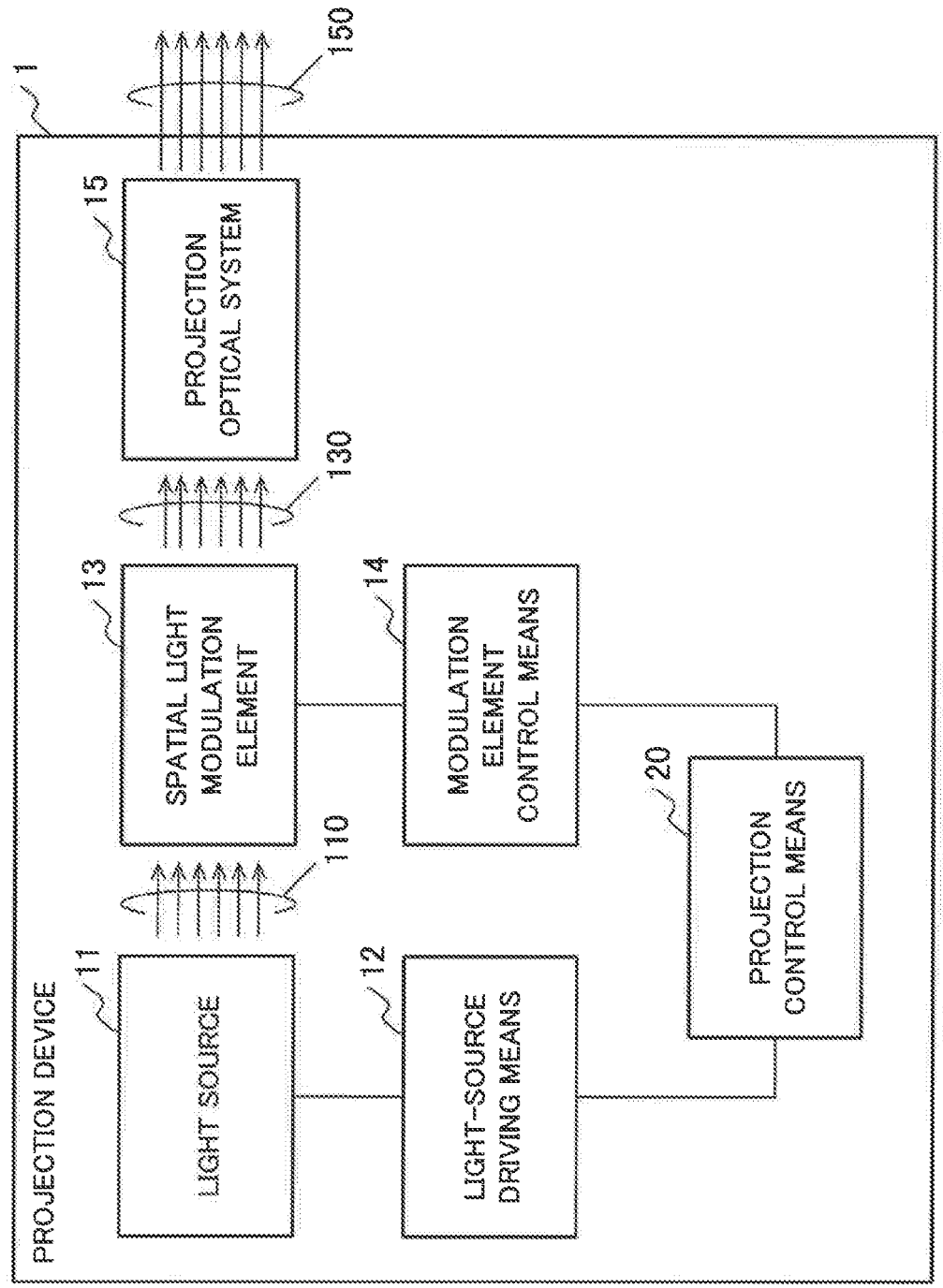
FIG. 1 is a conceptual diagram illustrating a configuration of a projection device according to a first example embodiment of the present invention.
Figure 2:
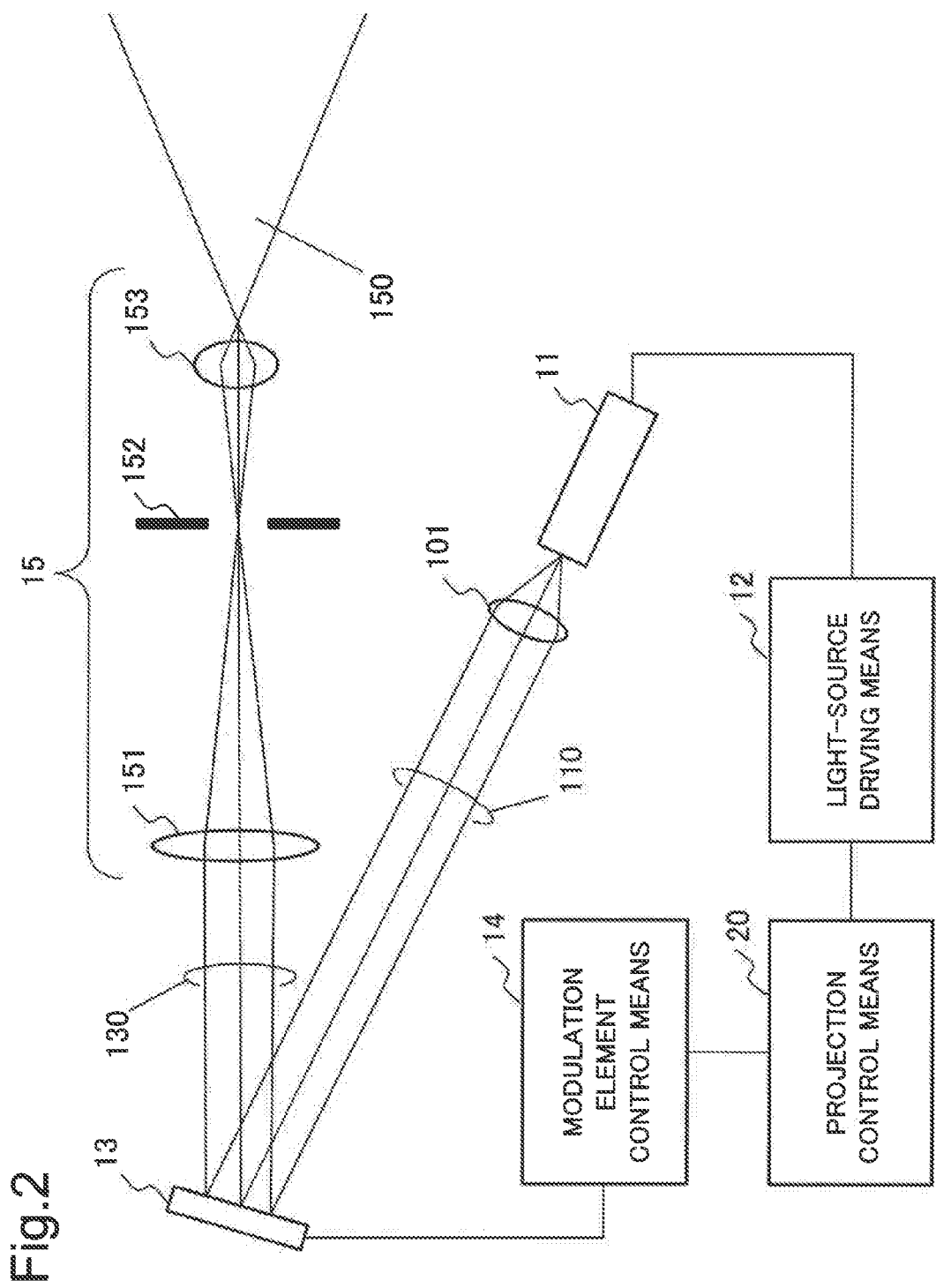
FIG. 2 is a conceptual diagram illustrating a configuration of an optical system of the projection device according to the first example embodiment of the present invention.

FIG. 1 is a block diagram illustrating a configuration of a projection device 1 according to the present example embodiment. As illustrated in FIG. 1, the projection device 1 includes a light source 11, a light-source driving means 12, a spatial light modulation element 13, a modulation element control means 14, a projection optical system 15, and a projection control means 20. FIG. 2 is a conceptual diagram illustrating a configuration of an optical system included in the projection device 1 according to the present example embodiment. Note that FIGS. 1 and 2 are conceptual diagrams, and the positional relationships among components and the irradiation directions of light are not necessarily accurate.

The light source 11 emits light 110 of a specific wavelength. For example, a laser light source can be used as the light source 11. The light 110 emitted from the light source 11 is preferably coherent light which phase is arranged. Typically, the light source 11 is configured in such a way as to emit light in the visible region. Note that the light source 11 may be configured in such a way as to emit light in a region other than the visible region, such as the infrared region or the ultraviolet region. Further, the light source 11 may be configured by a light source other than a laser light source, such as a light emitting diode, an incandescent lamp, or a discharge tube.

As illustrated in FIG. 2, light emitted from the light source 11 becomes coherent light through a collimator 101 and is incident on a display part of the spatial light modulation element 13. For example, when the light source 11 is configured in such a way as to emit light of a plurality of wavelengths, a color of display information can be changed by changing a wavelength of light emitted from the light source 11. Further, when the light source 11 is configured in such a way as to emit light of different wavelengths simultaneously, display information consisting of a plurality of colors can be displayed.

The light-source driving means 12 is a power supply for driving the light source 11 according to control by the projection control means 20 to cause the light source 11 to emit light.

The spatial light modulation element 13 is controlled by the modulation element control means 14. The spatial light modulation element 13 displays, on its own display part, a pattern (a phase distribution of an image) for generating display information which is information to be displayed on a projection surface in a projection range. In the present example embodiment, the display part of the spatial light modulation element 13 is irradiated with light 110 while a predetermined pattern is displayed on the display part. The spatial light modulation element 13 reflects (modulated light 130) incident light 110 toward the projection optical system 15.

As illustrated in FIG. 2, an incident angle of light 110 is non-perpendicular to the display part of the spatial light modulation element 13 in the present example embodiment. In other words, the emission axis of light 110 emitted from the light source 11 is set obliquely with respect to the display part of the spatial light modulation element 13 in the present example embodiment. Because the emission axis of light 110 is set obliquely with respect to the display part of the spatial light modulation element 13, light 110 is incident on the display part of the spatial light modulation element 13 without the need for the use of a beam splitter, and therefore utilization efficiency of light 110 can be improved.

The spatial light modulation element 13 can be implemented by a phase-modulating spatial light modulation element that receives incident coherent light 110 which phase is arranged, and modulates a phase of the incident light 110. Because light emitted from the projection optical system that uses the phase-modulating spatial light modulation element 13 is focus-free, a focal point does not need to be changed for each projection distance even when light is to be projected onto display regions (projection surfaces) set at a plurality of projection distances. Note that while the spatial light modulation element 13 may be an element that is different from a phase modulating type as long as display information can be displayed in each display region, a phase-modulating element is preferable for implementing focus-free.

A phase distribution of an image to be projected onto a projection surface within a projection range is displayed on the display part of the phase-modulating spatial light modulation element 13. In this case, the modulated light 130 reflected by the display region of the spatial light modulation element 13 becomes an image like an aggregation of a kind of diffraction grating, and the image is formed in such a way that light diffracted by the diffraction grating gathers.

The spatial light modulation element 13 is implemented, for example, by a spatial light modulation element that uses a ferroelectric liquid crystal, a homogeneous liquid crystal, a vertically aligned liquid crystal, or the like. Specifically, the spatial light modulation element 13 can be implemented by a liquid crystal on silicon (LCOS). Further, the spatial light modulation element 13 may be implemented by a micro electro mechanical system (MEMS).

By causing the phase-modulating spatial light modulation element 13 to operate in such a way as to switch a portion of projecting projection light one after another, energy can be concentrated on the part of display information. Accordingly, the use of the phase-modulating spatial light modulation element 13 allows an image to be displayed brighter than an image displayed using elements of other types, when output from the light source is the same.

The modulation element control means 14 causes a pattern for generating an image being projected onto a projection surface within a projection range to be displayed on the display part of the spatial light modulation element 13, according to control by the projection control means 20. The modulation element control means 14 controls the spatial light modulation element 13 in such a way that a parameter that determines a difference between a phase of light 110 with which the display part of the spatial light modulation element 13 is irradiated and a phase of modulated light 130 reflected at the display part changes.

The parameter that determines a difference between the phase of light 110 with which the display part of the spatial light modulation element 13 is irradiated and the phase of modulated light 130 reflected at the display part is a parameter relating to an optical property such as refractive index or light path length, for example. For example, the modulation element control means 14 changes the refractive index of the display part by changing a voltage applied to the display part of the spatial light modulation element 13. As a result, the light 110 with which the display part is irradiated is diffracted appropriately, based on the refractive index of the display part. In other words, a phase distribution of the light 110 with which the phase-modulating spatial light modulation element 13 is irradiated is modulated according to an optical property of the display part. Note that the method for controlling the spatial light modulation element 13 by the modulation element control means 14 is not limited to the one described here.

The projection optical system 15 converts modulated light 130 modulated by the spatial light modulation element 13 to irradiation light 150, and projects the irradiation light 150. As illustrated in FIG. 2, the projection optical system 15 includes a Fourier transform lens 151, an aperture 152 and a projection lens 153. Modulated light 130 modulated by the spatial light modulation element 13 is irradiated as irradiation light 150 by the projection optical system 15. Note that any of the components of the projection optical system 15 may be omitted as long as an image can be projected onto a projection surface within a projection range.

The Fourier transform lens 151 is an optical lens for forming, at a focal point in the vicinity, an image that is formed when modulated light 130 reflected by the display part of the spatial light modulation element 13 is projected at infinity. In the example in FIG. 2, the focal point is formed at the position of the aperture 152.

The aperture 152 has a function of blocking higher-order light included in light focused by the Fourier transform lens 151 and identifying a display region. An opening of the aperture 152 is opened smaller than the outer circumference of the display region at the position of the aperture 152, and is provided in such a way as to block a region around an image at the position of the aperture 152. For example, the opening of the aperture 152 is formed in a rectangular or circular shape. While the aperture 152 is preferably provided at the focal position of the Fourier transform lens 151, the aperture 152 may be provided in a position deviated from the focal position as long as the function of eliminating higher-order light can be fulfill.

The projection lens 153 is an optical lens that expands and projects light focused by the Fourier transform lens 151. The projection lens 153 projects irradiation light 150 in such a way that an image corresponding to a phase distribution displayed on the display part of the spatial light modulation element 13 is projected onto a projection surface within a projection range.

When the projection device 1 is used in an application in which line drawings such as simple symbols are projected, a portion such as a character, a symbol or a frame that constitute an image is irradiated with irradiation light 150 projected from the projection optical system 15 in a concentrated manner, rather than a projection range being uniformly irradiated. The projection device 1 therefore can practically reduce an amount of light required for displaying an equivalent image and suppress a total light output. Consequently, the projection device 1 can be configured with a small and low-power light source 11, and therefore an output of the light-source driving means 12 that drives the light source 11 can be lowered, and the overall power consumption can be reduced.

In accordance with an instruction from outside, the projection control means 20 sets conditions for making a ghost image (hereinafter referred to as a ghost) that appears in association with display information when light is projected onto a projection range difficult to visually recognize.

When a desired image is projected onto a projection surface, the projection control means 20 controls the light-source driving means 12 and the modulation element control means 14 in such a way as to cause a phase distribution of an image including a ghost compensation image and a desired image to be displayed on the display part of the spatial light modulation element 13, when the desired image is projected onto the projection surface.

The ghost compensation image is an image in which the brightness of a background portion of a rotated image resulting from rotating a desired image 180 degrees is set according to an estimate value of brightness of a ghost that appears in association with display information included in the desired image, and brightness of a portion corresponding to the ghost included in the rotated image is set lower than that of the background portion.

In the present example embodiment, the projection control means 20 stores a phase distribution of an image (hereinafter referred to as a ghost compensation image) in which a display information portion is bright whereas a ghost portion is dark and high brightness is set totally, together with a phase distribution of a desired image. In response to an instruction from the outside, the projection control means 20 selects a phase distribution of a ghost compensation image that corresponds to a desired image, together with a phase distribution of the desired image. Note that it is assumed in the present example embodiment that a phase distribution of a ghost compensation image for which an estimate value of brightness of a ghost is set according to brightness of display information to be displayed on a projection surface is used. Further, a correspondence table in which brightness of each piece of display information is associated with an estimate value of brightness of a ghost that is estimated according to the brightness of the piece of display information may be stored in advance, and may be used to configure is such a way as to acquire an estimate value of brightness of a ghost. A configuration may be made where an estimation formula for obtaining an estimate value of brightness of a ghost in relation to brightness of display information is used to estimate an estimate value of brightness of a ghost.

The projection control means 20 outputs the selected phase distributions of the ghost compensation image and the desired image to the modulation element control means 14. In addition, the projection control means 20 outputs light-source driving conditions for causing the selected phase distributions of the ghost compensation image and the desired image to be displayed on the display part of the spatial light modulation element 13, at desired timing, to the light-source driving means 12.

In general, brightness of a ghost is lower than that of desired display information. However, human eyes are sensitive to a steep change in brightness even when the brightness is low. In the present example embodiment, therefore, changes in brightness of a ghost portion is lowered so as to make the ghost difficult to visually recognize. Specifically, brightness of the background of the ghost is set to about a level at which a ghost appears, rather than complete black. Then, an image including an image resulting from rotating display information 180 degrees is formed in a portion where a ghost is likely to appear, thereby making the ghost difficult to visually recognize.

For example, when brightness of a ghost is about 5% of brightness of a display image, the ghost can be made difficult to visually recognize by increasing brightness of the background totally by 5%. Further, when brightness of a ghost is about 20% of brightness of a display image, brightness of the background may be increased totally by about 5% to make the ghost difficult to visually recognize, because when the brightness of the background is increased totally by 20%, the display image itself becomes difficult to visually recognize. Note that the numerical values given here are illustrated one example, and are not intended to limit the scope of the present invention.

[Projection Control Means]

Figure 3:
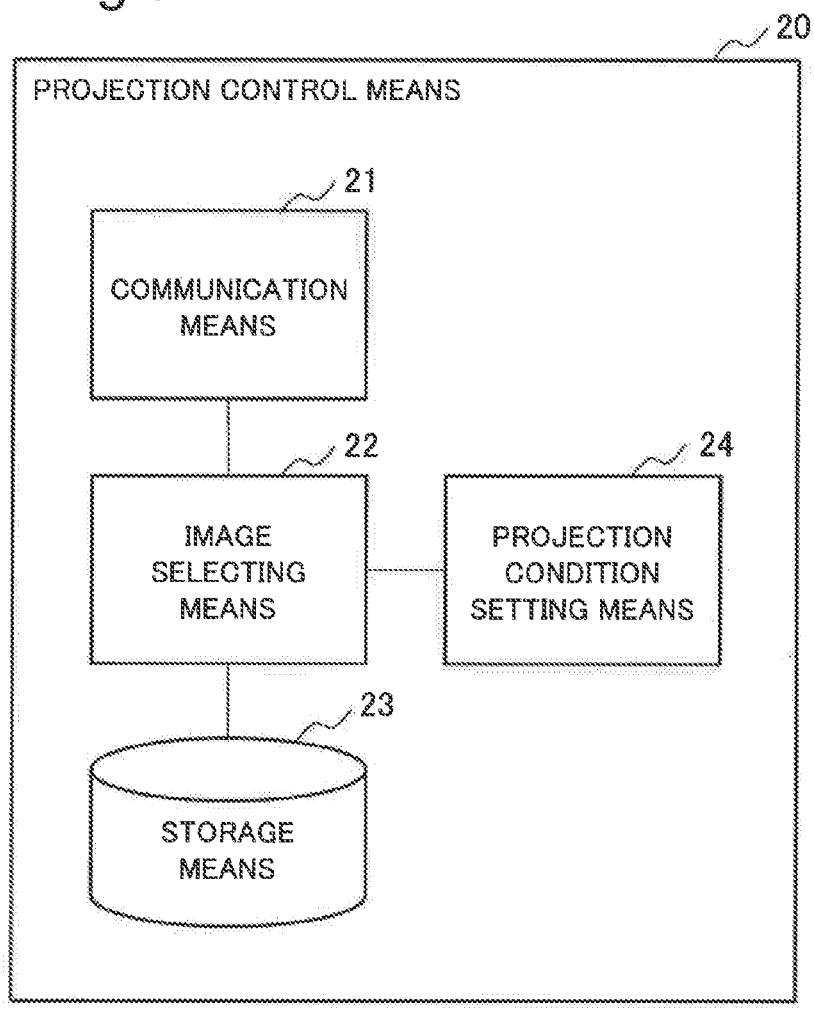
FIG. 3 is a block diagram illustrating a configuration of a projection control means provided in the projection device according to the first example embodiment of the present invention.

A configuration of the projection control means 20 will be described next with reference to a drawing. FIG. 3 is a block diagram illustrating a configuration of the projection control means 20. As illustrated in FIG. 3, the projection control means includes a communication means 21, an image selecting means 22, a storage means 23, and a projection condition setting means 24.

The communication means 21 receives information relating to a desired image to be projected onto a projection surface within a projection range.

The image selecting means 22 selects data stored in the storage means 23 according to information received by the communication means 21. At this point in time, the image selecting means 22 selects a phase distribution of a ghost compensation image corresponding to a desired image to be projected onto the projection surface within the projection range.

A phase distribution of a ghost compensation image corresponding to a desired image is stored in the storage means 23. Note that a desired image itself or a ghost compensation image itself corresponding to the desired image may be stored in the storage means 23.

Figure 4:
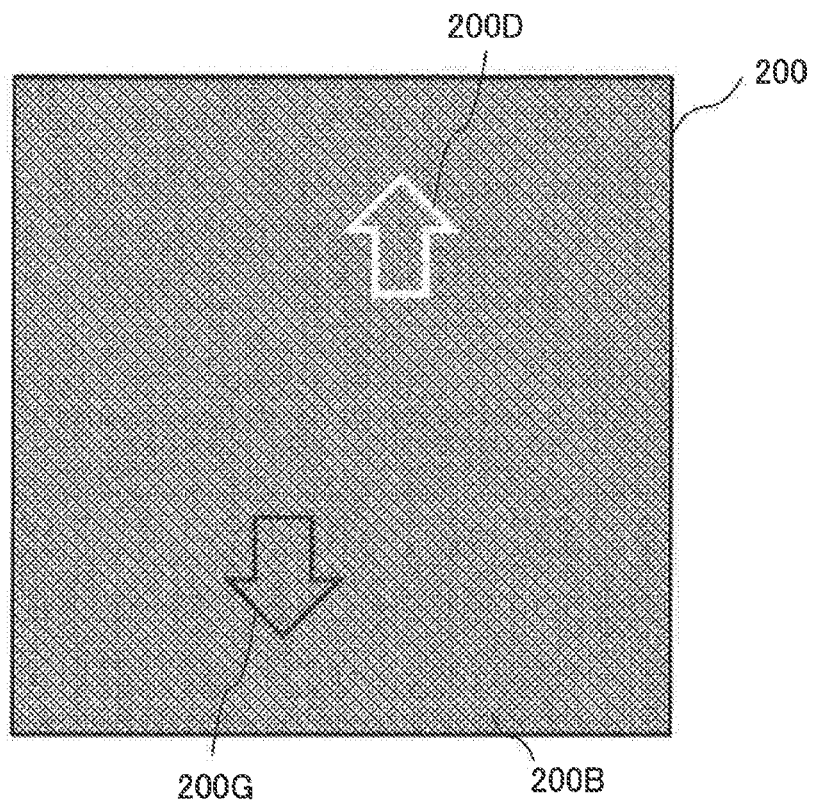
FIG. 4 is a conceptual diagram illustrating one example of an image stored in the projection control means provided in the projection device according to the first example embodiment of the present invention.

FIG. 4 illustrates one example (ghost compensation image 200) of a ghost compensation image corresponding to a phase distribution stored in the storage means 23. Note that, in reality, the phase distribution of the ghost compensation image in FIG. 4 is stored in the storage means 23. In FIG. 4 and subsequent drawings, images corresponding to phase distributions are depicted, because when phase distributions are depicted, images corresponding to the phase distributions are difficult to identify.

In the ghost compensation image 200, a bright portion (hereinafter, referred to as a display information corresponding portion 200D) corresponding to display information, a dark portion (hereinafter, referred to as a ghost corresponding portion 200G) corresponding to a ghost that appears in association with the display information, and a background (hereinafter, referred to as a background portion 200B) which is the rest of the image are set. Brightness of the background portion 200B excluding the display information corresponding portion 200D and the ghost corresponding portion 200G is set according to brightness of the ghost.

The projection condition setting means 24 sets projection conditions for causing phase distributions of the desired image and the ghost compensation image, selected by the image selecting means 22, to be displayed on the display part of the spatial light modulation element 13.

Projection conditions include a light-source driving condition and a modulation element control means. The light-source driving condition is a condition for driving and controlling the light-source driving means 12 in order to project the desired image onto the projection surface within the projection range at a desired timing. The modulation element control means is a condition for controlling the modulation element control means 14 in order to cause the phase distribution of the ghost compensation image to be displayed on the display part of the spatial light modulation element 13.

The projection condition setting means 24 outputs the light-source driving condition to the light-source driving means 12 and outputs the modulation element control means to the modulation element control means 14.

Figure 5:
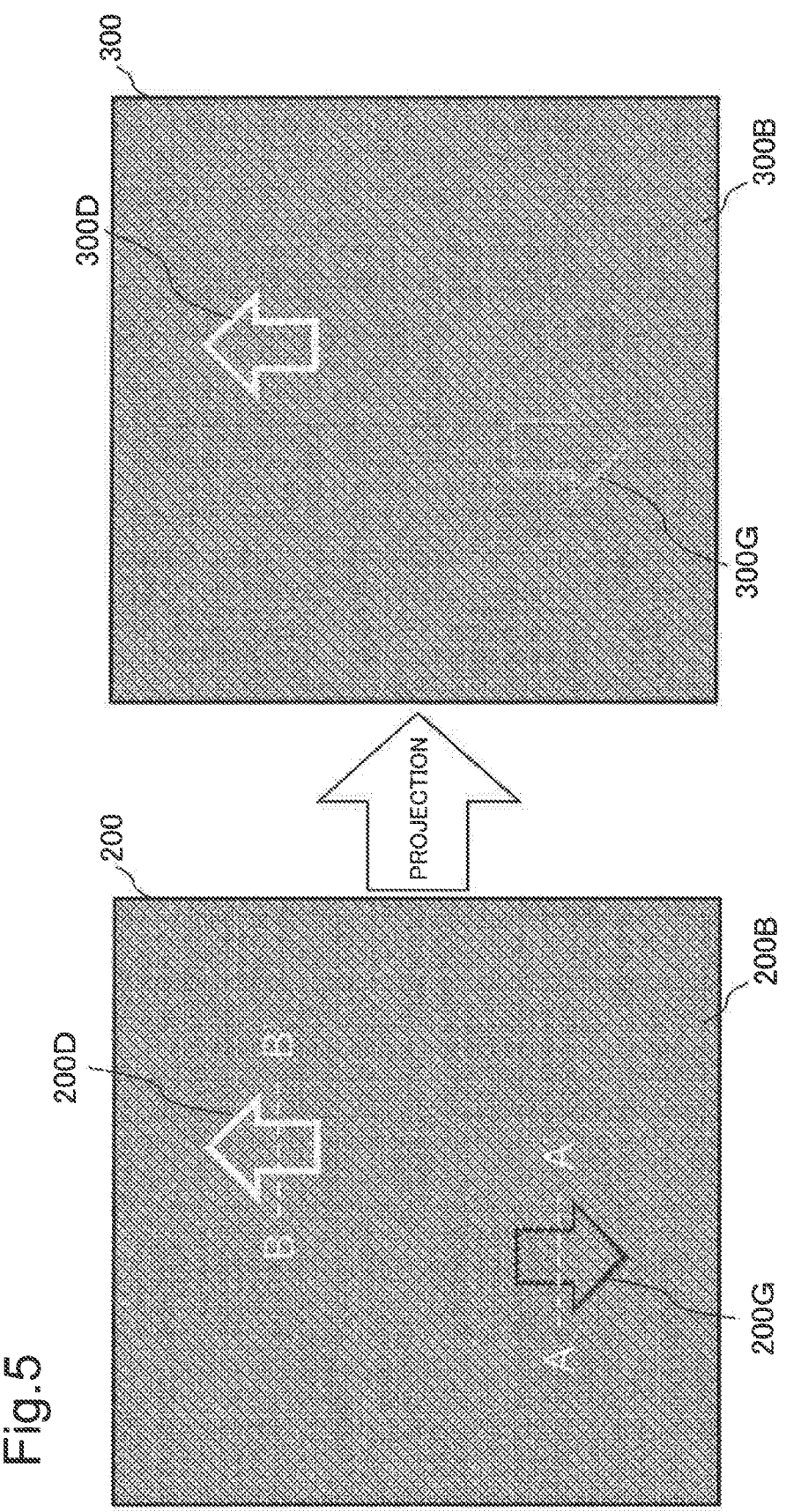
FIG. 5 is a conceptual diagram illustrating one example in which a ghost compensation image stored in the projection device according to the first example embodiment of the present invention is projected.

FIG. 5 illustrates one example (a viewing image 300) of an image (right side) formed on a projection surface by light projected by using a phase distribution of the ghost compensation image 200 (left side). In FIG. 5, line A-A' on the ghost corresponding portion 200G and line B-B' on the display information corresponding portion 200D are not elements that are included in the ghost compensation image 200 but are provided for purposes of explanation of brightness of portions corresponding to display information 300D and a ghost 300G.

In the viewing image 300, the desired display information 300D is displayed bright whereas the ghost 300G is difficult to visually recognize. This is because a background portion 300B of the viewing image 300 is set according to the brightness of the ghost 300G. Note that while the ghost 300G in the viewing image 300 is depicted as being visually recognized in FIG. 5, the ghost 300G can be made more difficult to visually recognize by setting brightness of the background portion 300B equal to the brightness of the ghost 300G.

Figure 6:
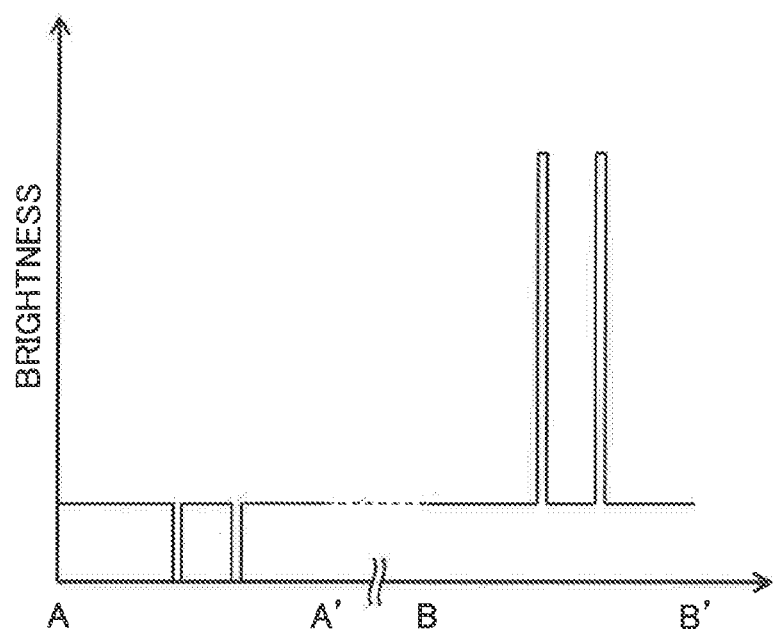
FIG. 6 is a graph illustrating changes in brightness set along line A-A' and line B-B' in FIG. 5.

FIG. 6 is a graph illustrating changes in brightness set along line A-A' and line B-B' in the ghost compensation image in FIG. 5.

Brightness of the background portion 200B is set according to an actual brightness of the ghost 300G. The brightness of the ghost corresponding portion 200G is set lower than the brightness of the background portion 200B. In the example in FIG. 6, the brightness of the ghost corresponding portion 200G is set to 0. Then, the brightness of the display information corresponding portion 200D is set higher than the brightness of the background portion 200B.

In the present example embodiment, a phase distribution of the ghost compensation image 200 in which a low brightness is set for the ghost corresponding portion 200G and a high brightness is set for the display information corresponding portion 200D as illustrated in FIG. 6 is used. As a result, according to the present example embodiment, a difference in brightness between the ghost 300G and the background portion 300B becomes small, and the ghost 300G becomes difficult to visually recognize, as in the viewing image 300 in FIG. 5.

Ghost compensation images used by the projection device 1 according to the present example embodiment will be described here by taking several variations as examples.

Modification Example 1

When a high brightness is set for the entire background portion 300B as illustrated in FIG. 5, contrast between the display information 300D and the background portion 300B in the viewing image 300 decreases, and, in some cases, the display information 300D becomes difficult to visually recognize. In modification example 1, a lower brightness is set for a background (first region) of display information, and a higher brightness is set for a background (second region) of a ghost as in FIG. 5. The first region is set around the display information. The second region is set around the ghost, and the brightness is adjusted according to an estimate value of brightness of the ghost. For example, a configuration can be made where an estimate value of brightness of the ghost is acquired using a correspondence table in which brightness of each piece of display information is associated with an estimate value of brightness of a ghost that is estimated according to the brightness of each piece of display information. Further, a configuration may be made where an estimate value of brightness of the ghost is obtained by using an estimation formula for estimating brightness of the ghost from brightness of display information, for example.

The projection control means 20 outputs projection conditions for causing a phase distribution of a ghost compensation image including the first region and the second region to be displayed on the display part of the spatial light modulation element 13, to the light-source driving means 12 and the modulation element control means 14.

Figure 7:
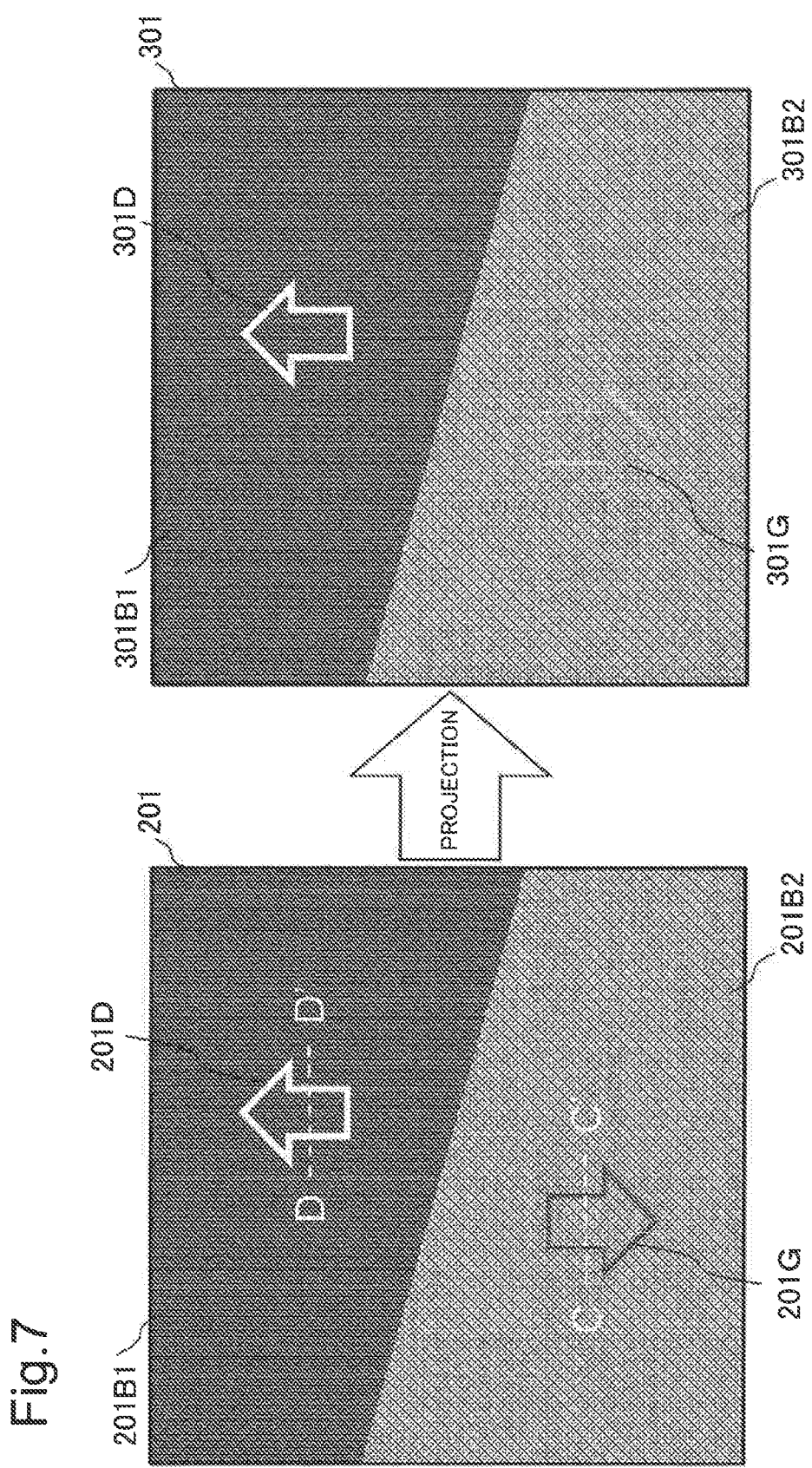
FIG. 7 is a conceptual diagram illustrating one example in which a ghost compensation image stored in the projection device according to the first example embodiment of the present invention is projected.

FIG. 7 illustrates one example (a viewing image 301) of an image (right side) formed on a projection surface, when a ghost is compensated by using a phase distribution of a ghost compensation image 201 (left side). In FIG. 7, line C-C' on a ghost corresponding portion 201G and line D-D' on a display information corresponding portion 201D are not elements that are included in the ghost compensation image 201 but are provided for purposes of explanation of brightness of portions corresponding to display information 301D and a ghost 301G.

In the viewing image 301, the desired display information 301D is displayed brighter, while conditions for making the ghost 301G difficult to visually recognize are maintained. This is because a background portion 301B1 of the desired display information 301D is darkened and brightness of a background portion 301B2 of the ghost 301G is set according to the brightness of the ghost 301G. Note that while the ghost 301G in the viewing image 301 is depicted as being visually recognizable in FIG. 7, the ghost 301G is made difficult to visually recognize by setting the brightness of the background portion 301B2 of the ghost 301G equal to the brightness of the ghost 301G.

Figure 8:
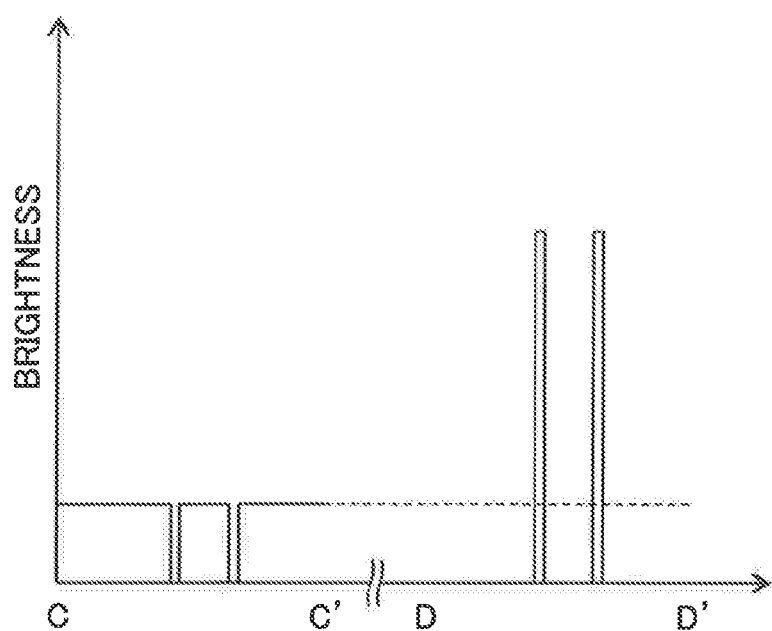
FIG. 8 is a graph illustrating changes in brightness set along line C-C' and line D-D' in FIG. 7.

FIG. 8 is a graph illustrating changes in brightness set along line C-C' and line D-D' in the ghost compensation image 201 in FIG. 7. Brightness of the background portion is set according to an actual brightness of the ghost. The brightness of the ghost portion is set lower than the brightness of the background portion. In the example in FIG. 8, the brightness of the ghost portion is set to 0. Then, the brightness of the background of the display information portion is set to 0, and a high brightness is set for the display information itself.

In the present modification example, a phase distribution of the ghost compensation image 201 in which a low brightness is set for the ghost corresponding portion 201G, a high brightness is set for the display information corresponding portion 201D, and a low brightness is set for a background portion 201B1 of the display information corresponding portion 201D as illustrated in FIG. 8 is used. According to the present modification example, this result in a larger difference in brightness between the desired display information 301D and the background portion 301B1 than in a case where the ghost compensation image 200 in FIG. 5 is used, and thus the visibility of the display information 301D can be improved.

Modification Example 2

In the case where an image is divided into two, namely a bright portion and a dark portion as illustrated in FIG. 7, the background of a ghost is set bright when brightness of the ghost is high, and therefore a difference in brightness may be noticeable at the boundary between the bright portion and the dark portion. In the present modification example, low brightness is set for a background (first region) of display information, high brightness is set for a background (second region) of a ghost, and gradually changing brightness is set for a boundary region between the first region and the second region.

The projection control means 20 outputs projection conditions for causing a phase distribution of a ghost compensation image in which the brightness of the boundary region between the first region and the second region gradually changes to be displayed on the display part of the spatial light modulation element 13, to the light-source driving means 12 and the modulation element control means 14.

Figure 9:
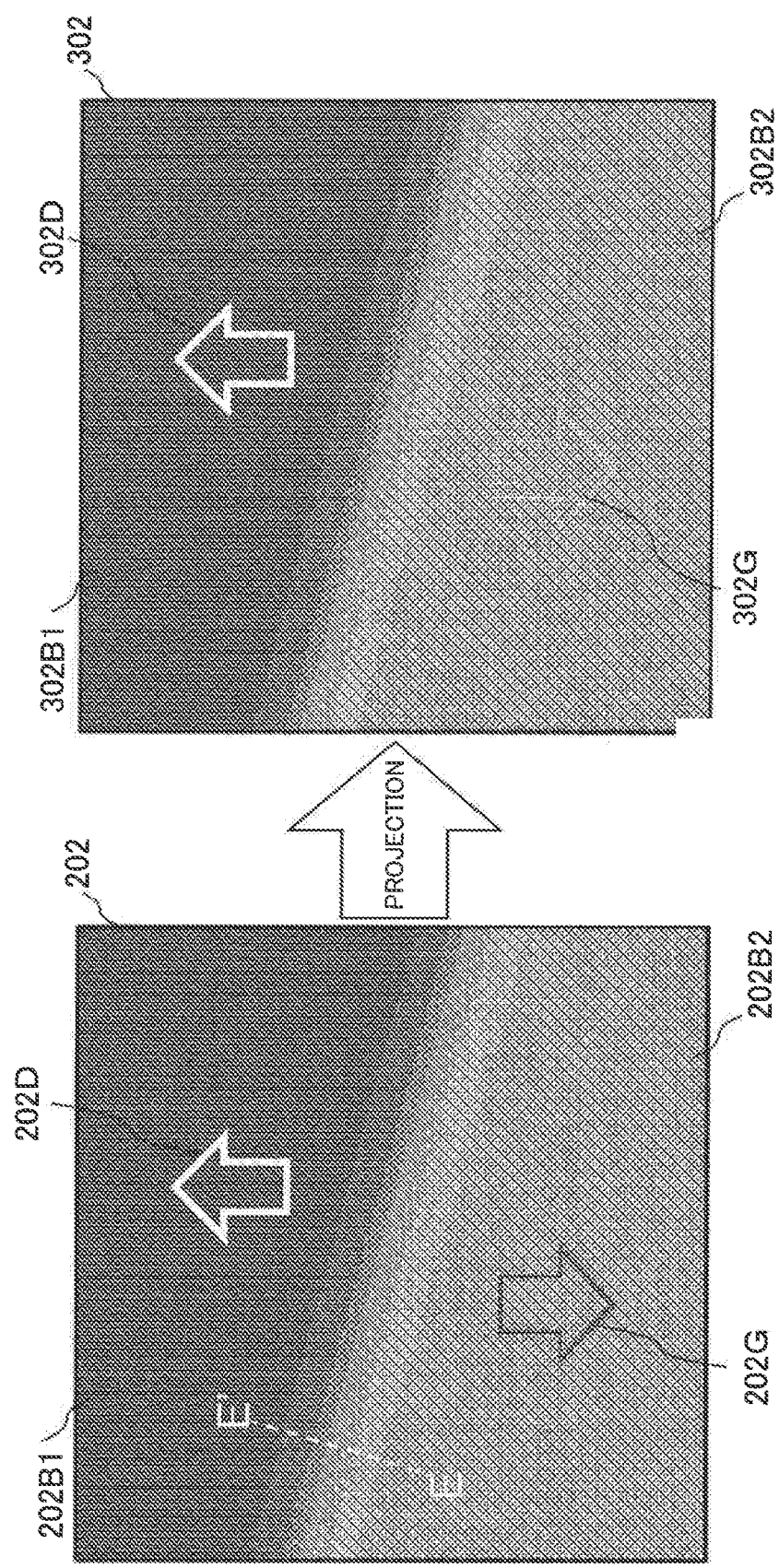
FIG. 9 is a conceptual diagram illustrating one example in which a ghost compensation image stored in the projection device according to the first example embodiment of the present invention is projected.

FIG. 9 illustrates one example (a viewing image 302) of an image (right side) formed on a projection surface, when a ghost is compensated by using a phase distribution of a ghost compensation image 202 (left side). In FIG. 9, line E-E' in the boundary region between a background portion 202B1 and a background portion 202B2 is not an element that is included in the ghost compensation image 202 but is provided for purpose of explanation of brightness of the boundary region between the background portion 202B1 and the background portion 202B2. Note that while the boundary region between the background portion 202B1 and the background portion 202B2 is represented by hatching in the ghost compensation image 202 in FIG. 9, a compensation image in which the brightness changes in a gradation manner is used in practice.

In the viewing image 302, display information 302D is displayed brighter, and an image in which the brightness in the boundary region between the background portion 202B1 and the background portion 202B2 changes smoothly and naturally is formed, while conditions for making a ghost 302G difficult to visually recognize are maintained. This is because the background portion 302B2 of the ghost 302G is set according to the brightness of the ghost 302G, the background portion 302B1 of the desired display information 302D is darkened, and the brightness of the boundary region is gradually changed. Note that while the ghost 302G in the viewing image 302 is depicted as being visually recognizable in FIG. 9, the ghost 302G is made more difficult to visually recognize by setting the brightness of the background portion 302B1 of the ghost 302G substantially equal to the brightness of the ghost 302G.

Figure 10:
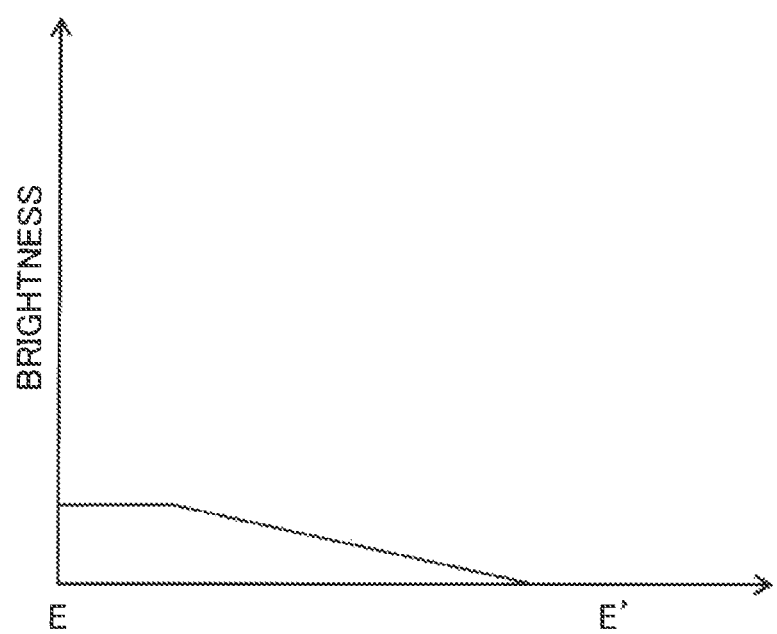
FIG. 10 is a graph illustrating changes in brightness set along line E-E' in FIG. 9.

FIG. 10 is a graph illustrating changes in brightness set along line E-E' in the ghost compensation image 202 in FIG. 9. In the present modification example, the brightness of the boundary region between the background portion 302B1 (first region) of the display information 302D for which a lower brightness is set and the background portion 302B2 (second region) of the ghost 302G for which a higher brightness is set is gradually changed as illustrated in FIG. 10. In other words, according to the present modification example, since the brightness is set as illustrated in FIG. 10, a more natural image like the viewing image 302 in FIG. 9 can be formed.

Modification Example 3

Background brightness does not necessarily need to be changed between halves of an image as in FIGS. 7 and 8. In the present modification example, a region (second region) for which a high brightness is set is provided around a ghost.

Figure 11:
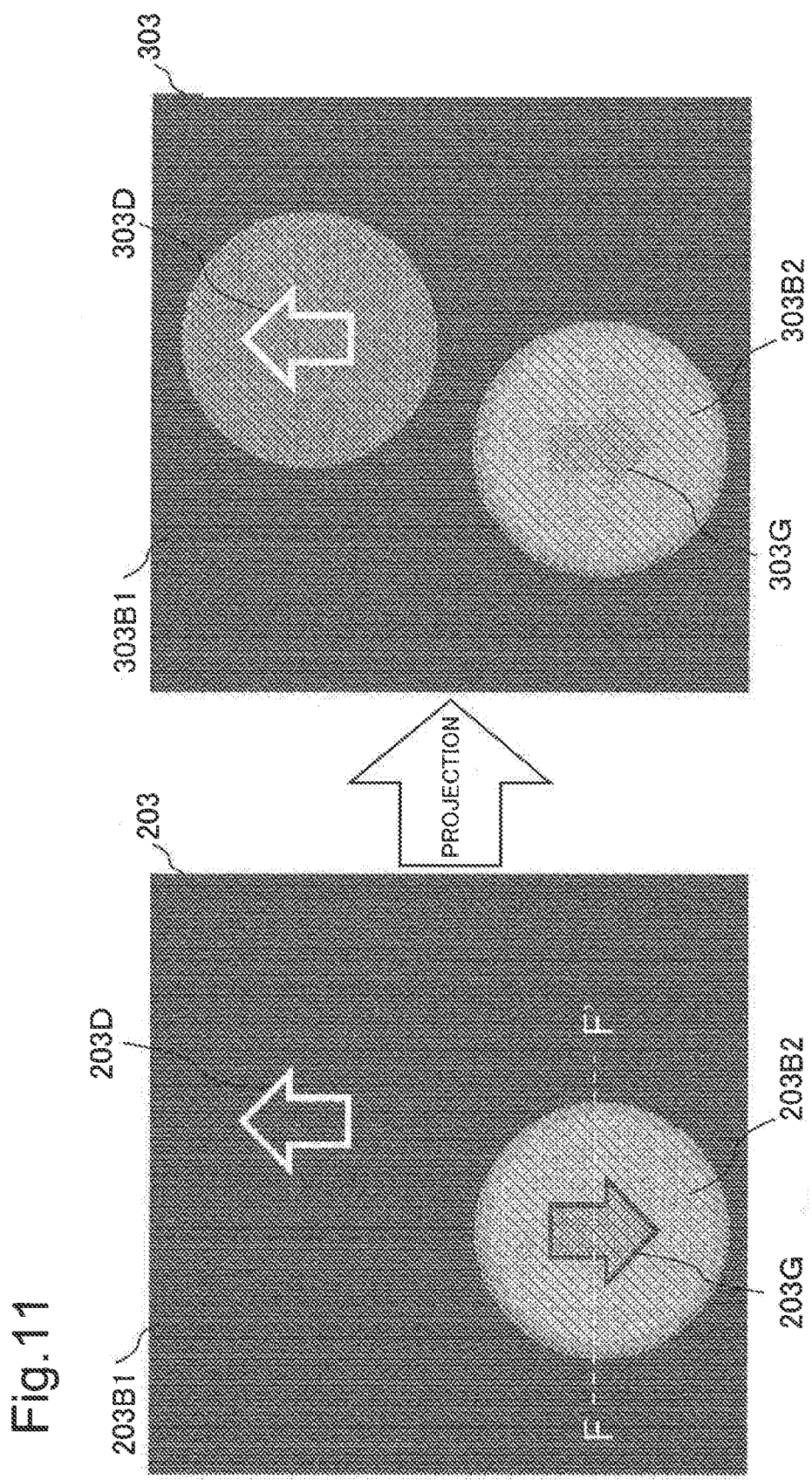
FIG. 11 is a conceptual diagram illustrating one example in which an image stored in the projection device according to the first example embodiment of the present invention is projected.

FIG. 11 illustrates one example (a viewing image 303) of an image (right side) formed on a projection surface, when a ghost is compensated by using a phase distribution of a ghost compensation image 203 (left side). Note that, in FIG. 11, line F-F' across a ghost corresponding portion 203G and a background portion 203B2 is not an element that is included in the ghost compensation image 203 but is provided for purpose of explanation of brightness set for a region around the ghost corresponding portion 203G. Further, in FIG. 11, a background portion 303B2 around a ghost 303G is equivalent to the second region, and other background portion 303B1 is equivalent to the first region.

In the viewing image 303, display information 303D is displayed brighter, and an image in which the ghost 303G is difficult to visually recognize is formed. This is because the background portion 303B2 (second region) around the ghost 303G is set according to the brightness of the ghost 303G, and the other background portion 303B1 (first region) is darkened totally. Further, gradually changing brightness is set for an edge region of the circular background portion 303B2 that is set around the ghost 303G in the present modification example. Note that, in the present modification example, a region around the display information 303D is slightly bright because of a ghost in the background portion 303B2. Further, while the ghost 303G in the viewing image 303 is depicted as being visually recognize in FIG. 11, the ghost 303G is made more difficult to visually recognize by setting the brightness of the background portion 303B2 of the ghost 303G equal to the brightness of the ghost 303G.

Figure 12:
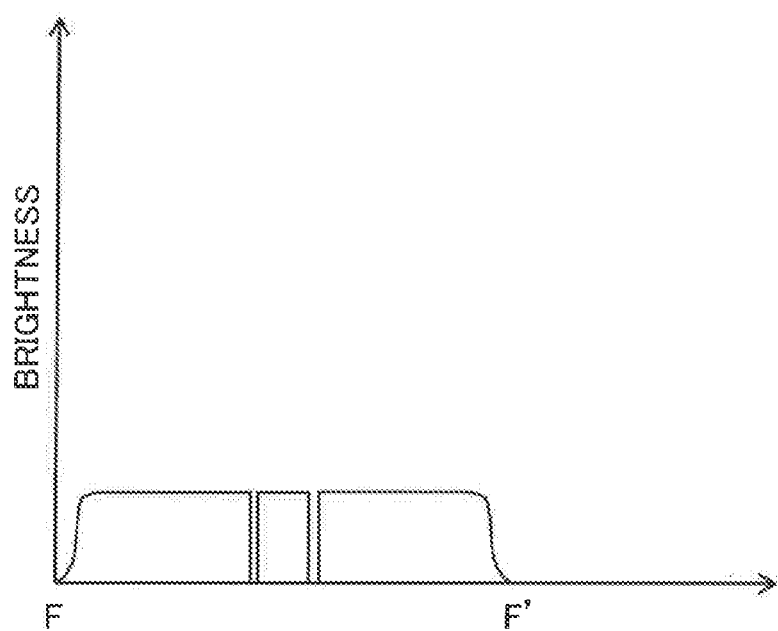
FIG. 12 is a graph illustrating changes in brightness set along line F-F' in FIG. 11.

FIG. 12 is a graph illustrating changes in brightness set along line F-F' in the ghost compensation image 203 in FIG. 11. Similar to the modification example 1 in FIG. 7, in the present modification example, the visibility of the display information 303D can be improved.

As described above, according to the present example embodiment, a ghost that appears when projection light is projected by using a phase-modulating light modulation element is made difficult to visually recognize.

Figure 25:
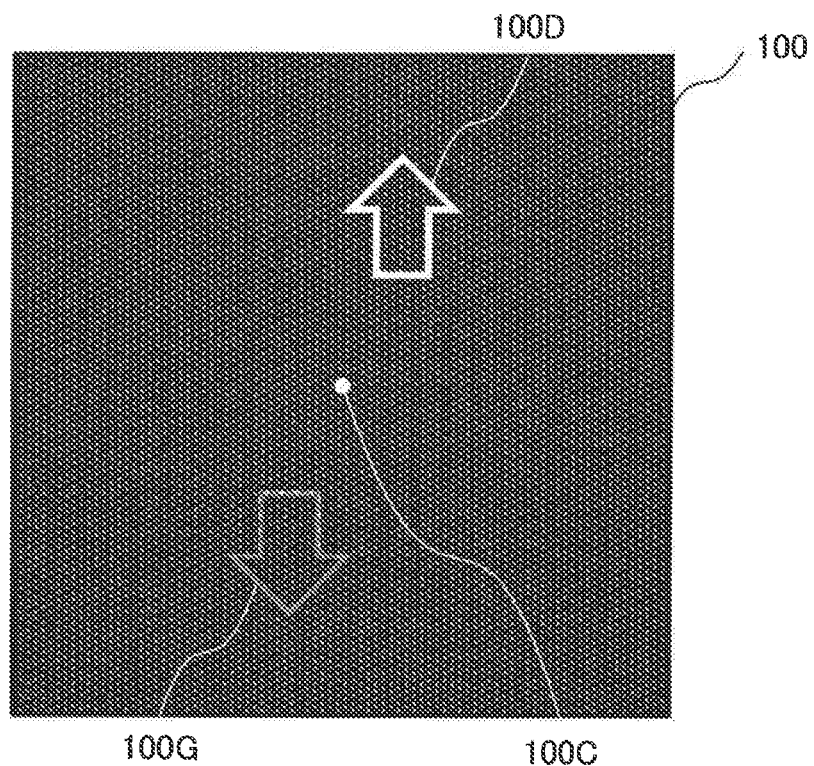
FIG. 25 is a conceptual diagram illustrating one example of an image projected without applying ghost compensation.

As illustrated in FIG. 25, a ghost appears in a position in which display information would be located when the display information is rotated 180 degrees about a center point. While only a first-order ghost is depicted in FIG. 25, higher-order ghosts such as second-order and third-order ghosts appear in reality. An N-th order ghost appears in a position at a distance N times of the distance from the center to an image, and the radius of the image is N times greater (N: a natural number). Ghosts also appear in the same direction as the direction of the display information. An object of the present example embodiment is to make a first-order ghost, which has the highest brightness, difficult to visually recognize. In order to make higher-order ghosts difficult to visually recognize, conditions that can compensate each of the ghosts may be set.

Second Example Embodiment

A projection device according to a second example embodiment of the present invention will be described next.

Figure 13:
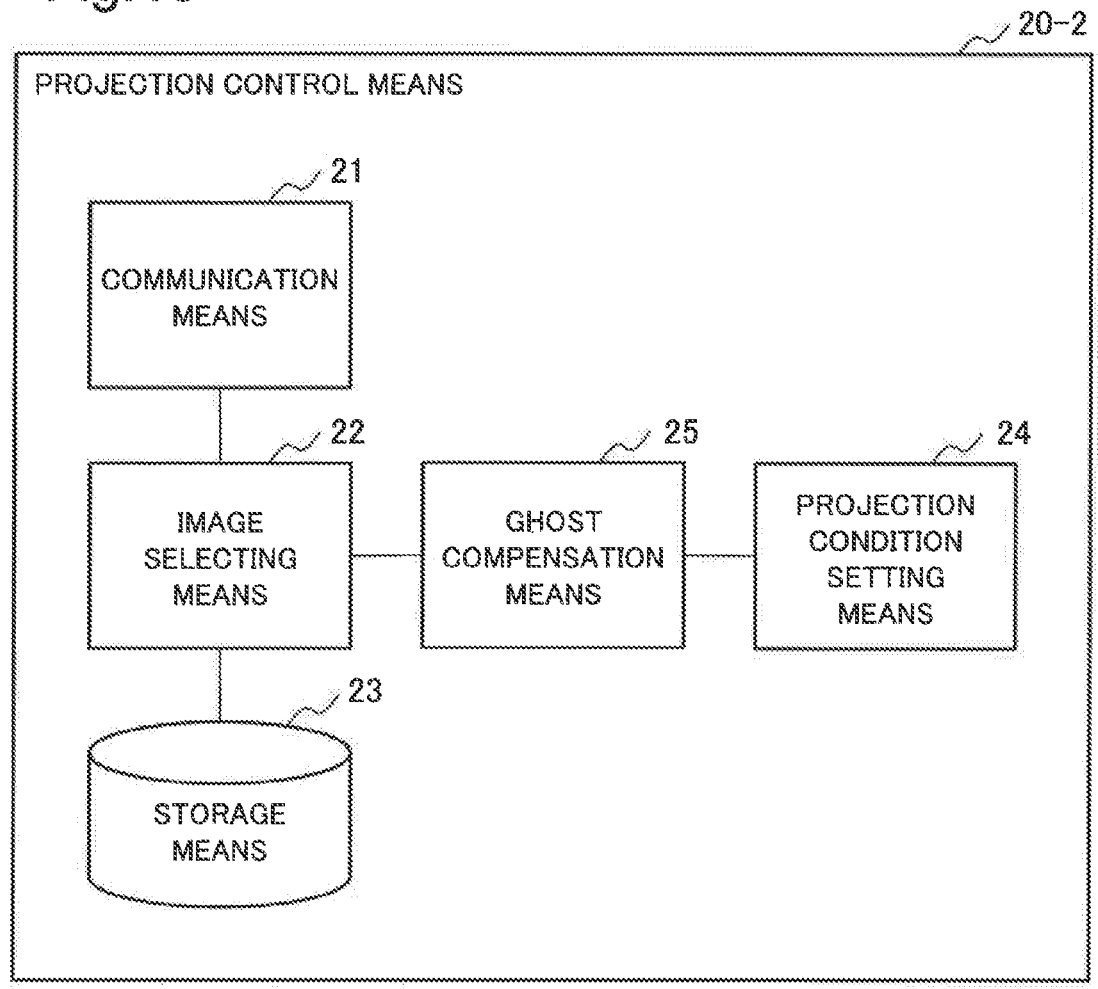
FIG. 13 is a block diagram illustrating a configuration of a projection control means according to a second example embodiment of the present invention.

FIG. 13 is a block diagram illustrating a configuration of a projection control means 20-2 provided in the projection device according to the present example embodiment. The projection control means 20-2 according to the present example embodiment differs from the projection control means 20 according to the first example embodiment in that the projection control means 20-2 includes a ghost compensation means 25. Note that the following description will focus on major changes, although there are changes in functions of components other than the ghost compensation means 25 as well as a result of the fact that the projection control means 20-2 includes the ghost compensation means 25.

The ghost compensation means 25 generates an image that is display information rotated 180 degrees in a position in which the display information would be located when the display information is rotated 180 degrees about the center point of a desired image, and sets brightness for a background from estimated brightness of a ghost. In other words, the ghost compensation means 25 generates an image in which the desired image is rotated 180 degrees and brightness for the background is set according to estimated brightness of a ghost, as a ghost compensation image. The ghost compensation means 25 then generates a phase distribution of the generated ghost compensation image by iterative Fourier transform.

[Ghost Compensation Means]

Figure 14:
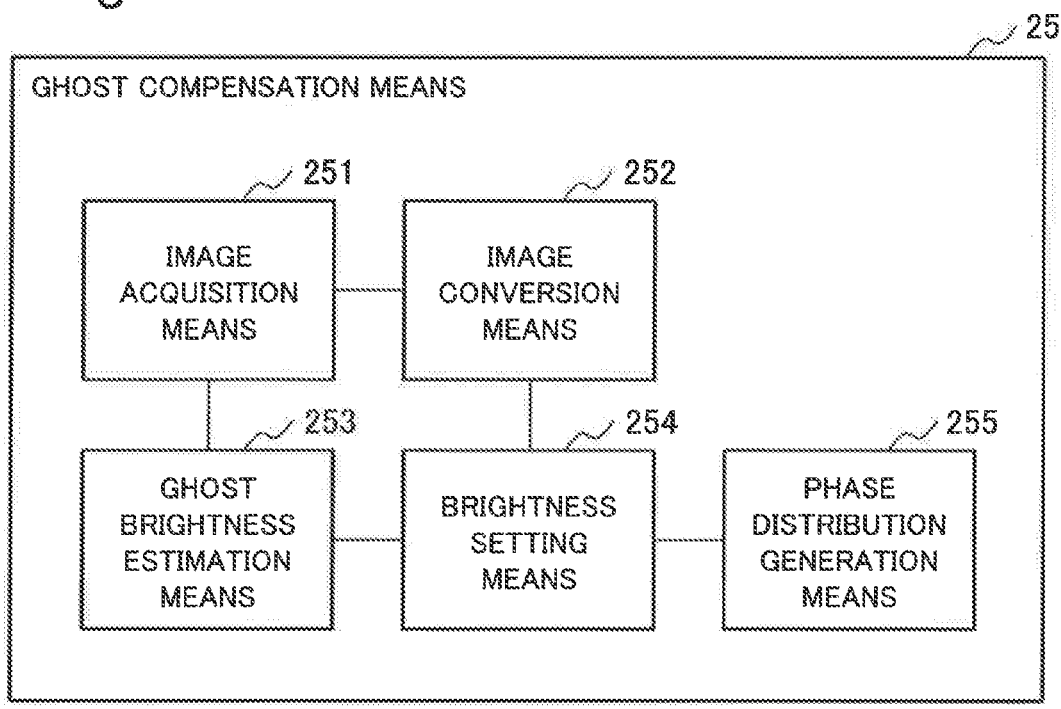
FIG. 14 is a block diagram illustrating a configuration of a ghost compensation means provided in the projection control means according to the second example embodiment of the present invention.

A configuration of the ghost compensation means 25 will be described next with reference to a drawing. FIG. 14 is a block diagram illustrating a configuration of the projection control means. As illustrated in FIG. 14, the ghost compensation means 25 includes an image acquisition means 251, an image conversion means 252, a ghost brightness estimation means 253, a brightness setting means 254, and a phase distribution generation means 255.

The image acquisition means 251 acquires a desired image including display information from an image selecting means 22.

The image conversion means 252 generates an image (hereinafter, referred to as a rotated image) by rotating the desired image including display information 180 degrees. In the rotated image generated by the image conversion means 252, the display information is moved to a position rotated 180 degrees about the center of the image.

The ghost brightness estimation means 253 estimates brightness of a ghost, based on brightness set for display information. The ghost brightness estimation means 253 calculates an estimate value of the brightness of the ghost by using a correspondence table in which brightness of each piece of display information is associated with brightness of a ghost or by using an estimation formula for estimating brightness of a ghost from brightness of display information.

The brightness setting means 254 acquires an image converted by the image conversion means 252, and sets brightness for a ghost background of the acquired image, based on brightness of a ghost estimated by the ghost brightness estimation means 253. The image for which the brightness of the background is set by the brightness setting means 254 is equivalent to a ghost compensation image.

The phase distribution generation means 255 generates a phase distribution of a ghost compensation image by applying iterative Fourier transform to the ghost compensation image. The phase distribution generation means 255 outputs the generated phase distribution to a projection condition setting means 24.

The phase distribution generation means 255 applies Fourier transform to an optical electric field distribution immediately after the spatial light modulation element 13, and obtains an optical electric field distribution E on a projection surface. The square of the optical electric field distribution E on the projection surface is equivalent to a light intensity distribution of a desired image. The phase distribution generation means 255 then applies inverse Fourier transform to the optical electric field distribution E on the projection surface, and obtains an optical electric field distribution immediately after the spatial light modulation element. The phase distribution generation means 255 performs optimization by iterative Fourier transform in which inverse Fourier transform and Fourier transform are repeated, and thereby obtains a phase distribution of the ghost compensation image. Note that the phase distribution generation means 255 may be configured to generate a phase distribution of the desired image.

Examples of Projection

Figure 15:
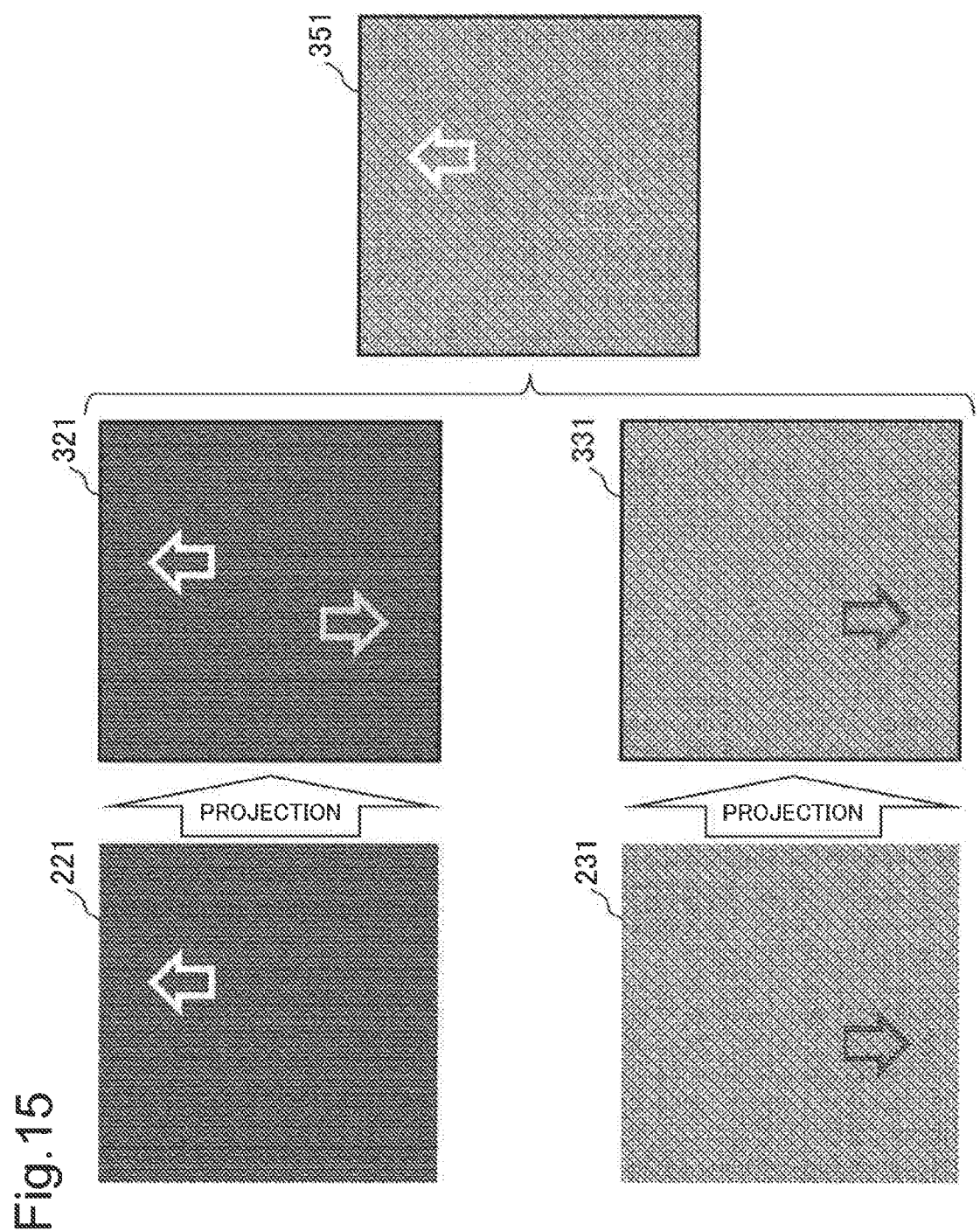
FIG. 15 is a conceptual diagram illustrating one example in which an image generated by the ghost compensation means included in the projection control means according to the second example embodiment of the present invention is projected.
Figure 16:
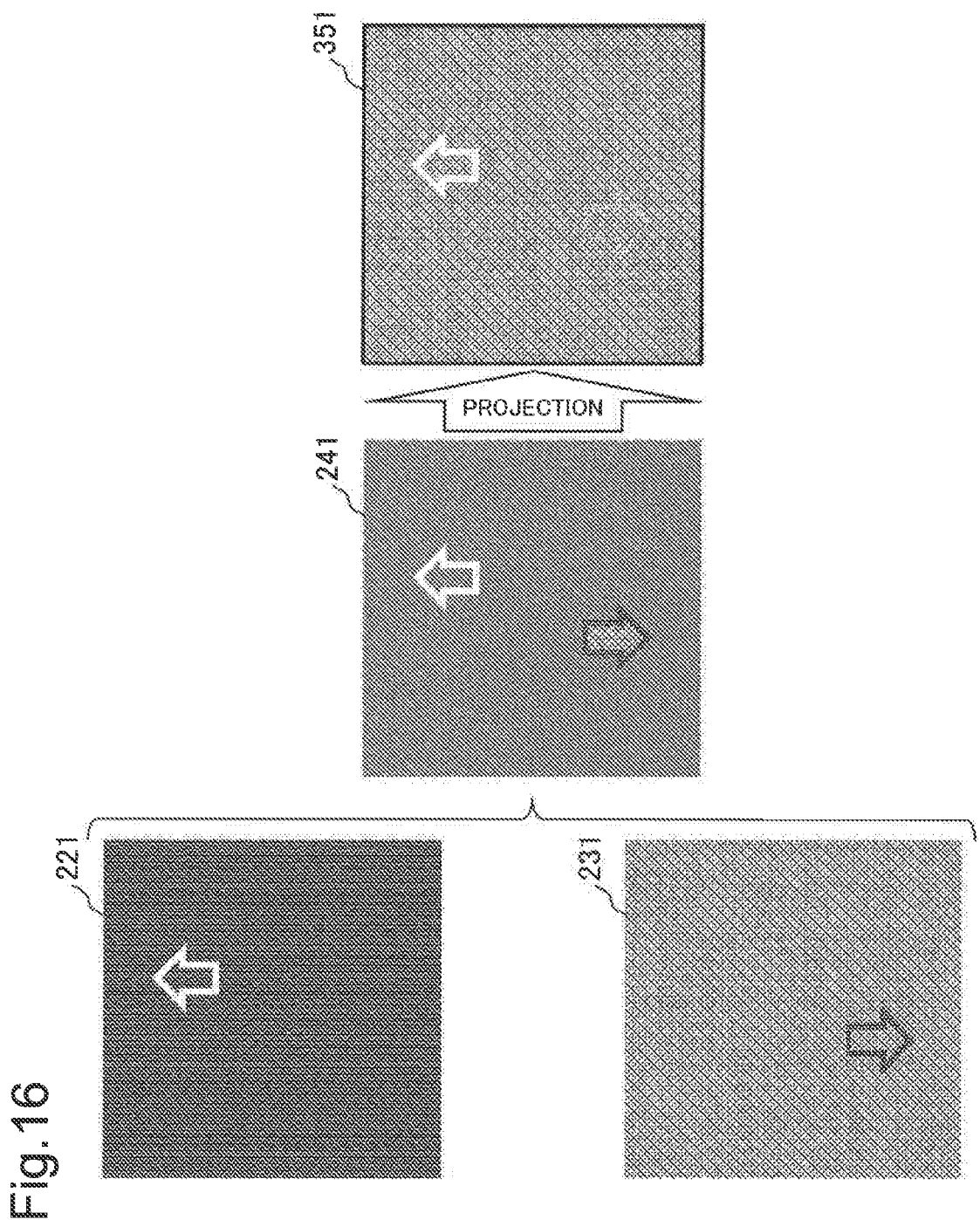
FIG. 16 is a conceptual diagram illustrating another example in which an image generated by the ghost compensation means included in the projection control means according to the second example embodiment of the present invention is projected.

FIGS. 15 and 16 are conceptual diagrams illustrating how images projected from the projection device according to the present invention are visually recognized.

An upper part of FIG. 15 illustrates images formed by projection light using a phase distribution of a desired image 221 including display information, and a lower part of FIG. 15 illustrates images formed by projection light using a phase distribution of a ghost compensation image 231 for compensating a ghost of the display information.

A projection image 321 in the upper part of FIG. 15 is an image projected by using the phase distribution of the desired image 221. A ghost of the display information is included in the projection image 321. A projection image 331 in the lower part of FIG. 15 is an image projected by using the phase distribution of the ghost compensation image 231. The projection image 331 is an image in which the ghost portion is dark and brightness of the background is set high according to the ghost. A viewing image 351 is an image visually recognized on a projection surface within a projection range. On the projection surface within the projection range, the viewing image 351, which is a combined image of the projection image 321 and the projection image 331, is visually recognized.

In the example in FIG. 15, the desired image 221 and the ghost compensation image 231 are projected without combining the desired image 221 including the ghost and the ghost compensation image 231. For example, a configuration can be made in which display regions of the display part of the spatial light modulation element 13 are allocated as a display region of the desired image 221 and a display region of the ghost compensation image 231, and the desired image 221 and the ghost compensation image 231 are projected simultaneously, so that the viewing image 351 is visually recognized on the projection surface. Further, for example, a configuration can be made in which the desired image 221 and the ghost compensation image 231 are alternatively projected by switching phase distributions to be displayed on the display part of the spatial light modulation element 13 at high speed, so that the viewing image 351 is also visually recognized on the projection surface.

An upper part of FIG. 16 illustrates a desired image 221 including display information, and a lower part of FIG. 16 illustrates a ghost compensation image 231 for compensating a ghost of the display information.

A combined image 241 is an image generated by combining the desired image 221 with the ghost compensation image 231. For example, the brightness setting means 254 may combines the desired image 221 with the ghost compensation image 231. Further, brightness setting means 254 may add a means for combining the desired image 221 with the ghost compensation image 231 to the ghost compensation means 25. The viewing image 351 is an image that is visually recognized on the projection surface within the projection range. On the projection surface within the projection range, the viewing image 351 formed by projecting the combined image 241 is visually recognized.

The example in FIG. 16 does not require assigning images by dividing the display part or switching between phase distributions to be displayed on the display part at high speed, in projection processing, because a phase distribution of the combined image 241 may be displayed on the display part of the spatial light modulation element 13. Accordingly, the projection control in FIG. 16 is simpler than the projection control in FIG. 15.

(Operation)

Figure 17:
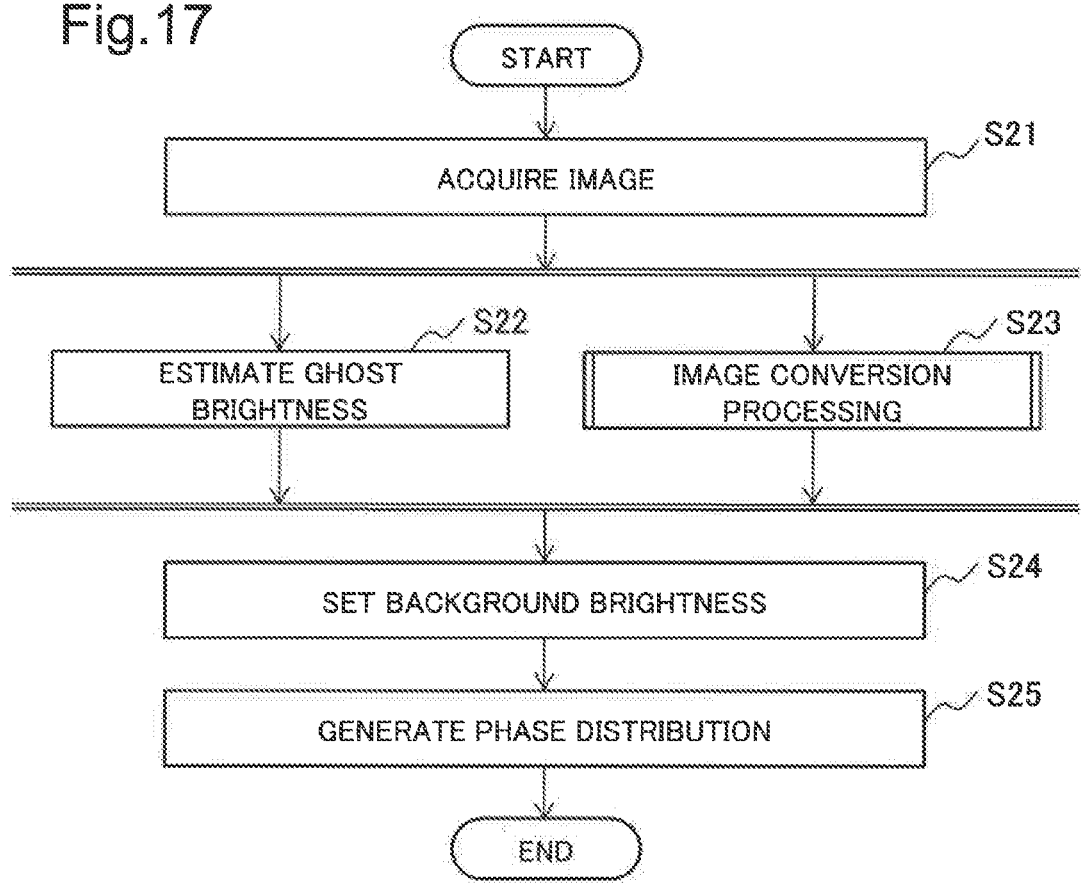
FIG. 17 is a flowchart illustrating an operation of the ghost compensation means included in the projection control means according to the second example embodiment of the present invention.

An operation of the ghost compensation means 25 according to the present example embodiment will be described next. FIG. 17 is a flowchart for explaining an operation of the ghost compensation means 25 according to the present example embodiment. The description of FIG. 17 will focus on components of the ghost compensation means 25.

In FIG. 17, first, the image acquisition means 251 acquires a desired image including display information from the image selecting means 22 (step S21). The image acquisition means 251 outputs the desired image to the ghost brightness estimation means 253 and the image conversion means 252.

The ghost brightness estimation means 253 estimates brightness of a ghost from brightness set for the display information included in the acquired desired image (step S22). The ghost brightness estimation means 253 outputs the estimate value of the brightness of the ghost to the brightness setting means 254.

The image conversion means 252 applies image conversion to the acquired desired image (step S23). In the present example embodiment, the image conversion means 252 generates an image in which the desired image is rotated 180 degrees about the center of the image (hereinafter, referred to as a rotated image). The image conversion means 252 outputs the generated rotated image and the desired image to the brightness setting means 254.

Based on the desired image and the rotated image acquired from the image conversion means 252 and the estimate brightness value of the ghost acquired from the ghost brightness estimation means, the brightness setting means 254 sets brightness for the acquired rotated image (step S24). The brightness setting means 244 outputs a generated ghost compensation image to the phase distribution generation means 255 together with the desired image.

The phase distribution generation means 255 generates a phase distribution of the ghost compensation image by applying iterative Fourier transform to the ghost compensation image (step S25). The phase distribution generation means 255 outputs the phase distributions of the generated ghost compensation image and the desired image to the projection condition setting means 24.

The operation of the ghost compensation means 25 is described above. Note that while an example in which the processing in step S22 and step S23 are performed in parallel is illustrated in FIG. 17, the processing in step S22 and step S23 may be sequentially performed.

As described above, the projection device according to the present example embodiment internally generates a ghost compensation image and a phase distribution thereof, and uses the generated phase distribution to make a ghost difficult to visually recognize, without the need for providing a phase distribution of a desired image in advance.

Third Example Embodiment

Figure 18:
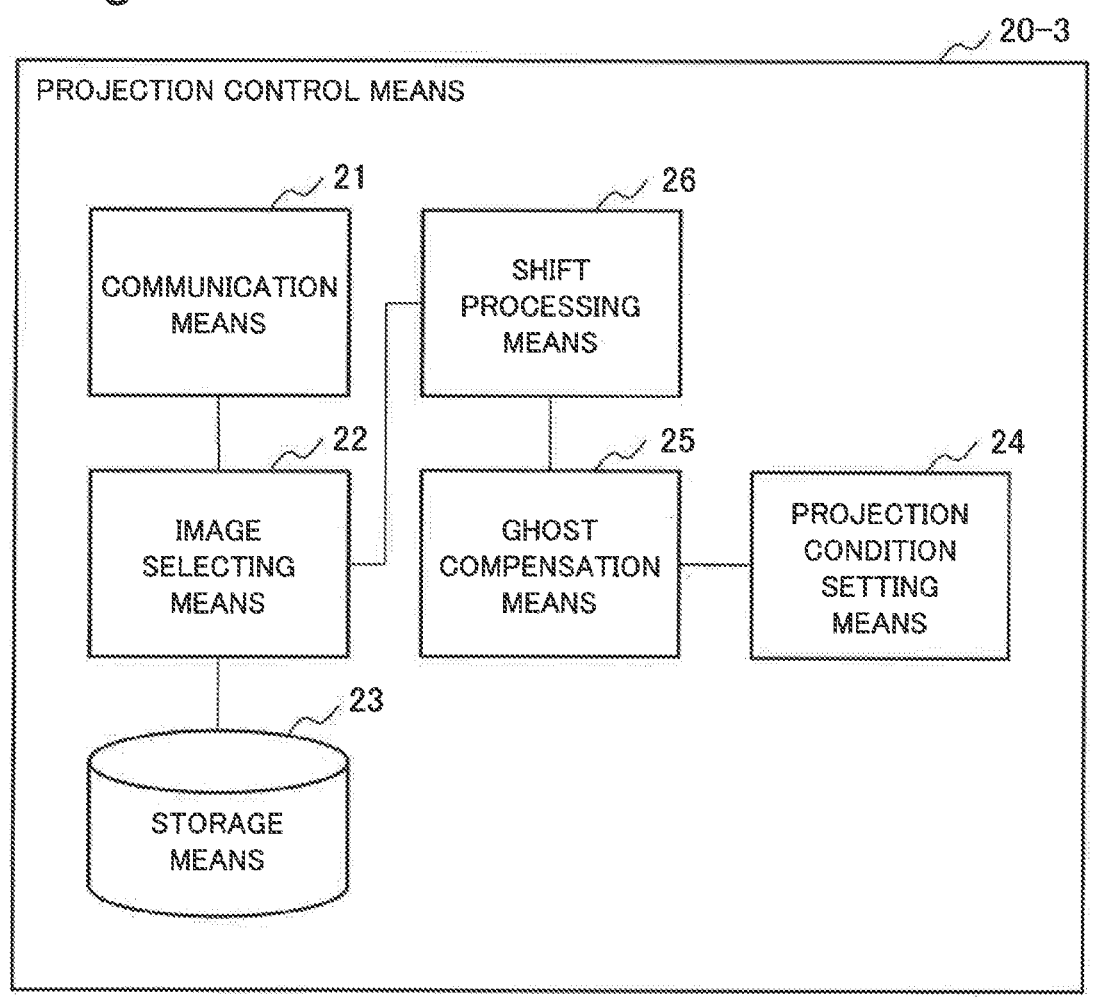
FIG. 18 is a block diagram illustrating a configuration of a ghost compensation means included in a projection control means according to a third example embodiment of the present invention.

A projection device according to a third example embodiment of the present invention will be described next. FIG. 18 is a block diagram illustrating a configuration of a projection control means 20-3 provided in the projection device according to the present example embodiment. The projection control means 20-3 according to the present example embodiment differs from the projection control means 20-2 according to the second embodiment in that the projection control means 20-3 includes a shift processing means 26. Note that the following description will focus on major changes, although there are changes in functions of components other than the shift processing means 26 as well as a result of the fact that the projection control means 20-3 includes the shift processing means 26.

The shift processing means 26 performs shift processing in such a way as to move display information included in a desired image to a desired position in an image plane. The shift processing means 26 outputs an image (hereinafter, referred to as the shift image) on which the shift processing is performed to a ghost compensation means 25.

The ghost compensation means 25 generates a ghost compensation image for the shift image, and generates a phase distribution of the generated ghost compensation image.

According to the configuration of the present example embodiment illustrated in FIG. 18, even when the position of a ghost in an image plane is changed by the shift processing, an image for ghost compensation that meets the change can be generated.

Examples of Projection

Figure 19:
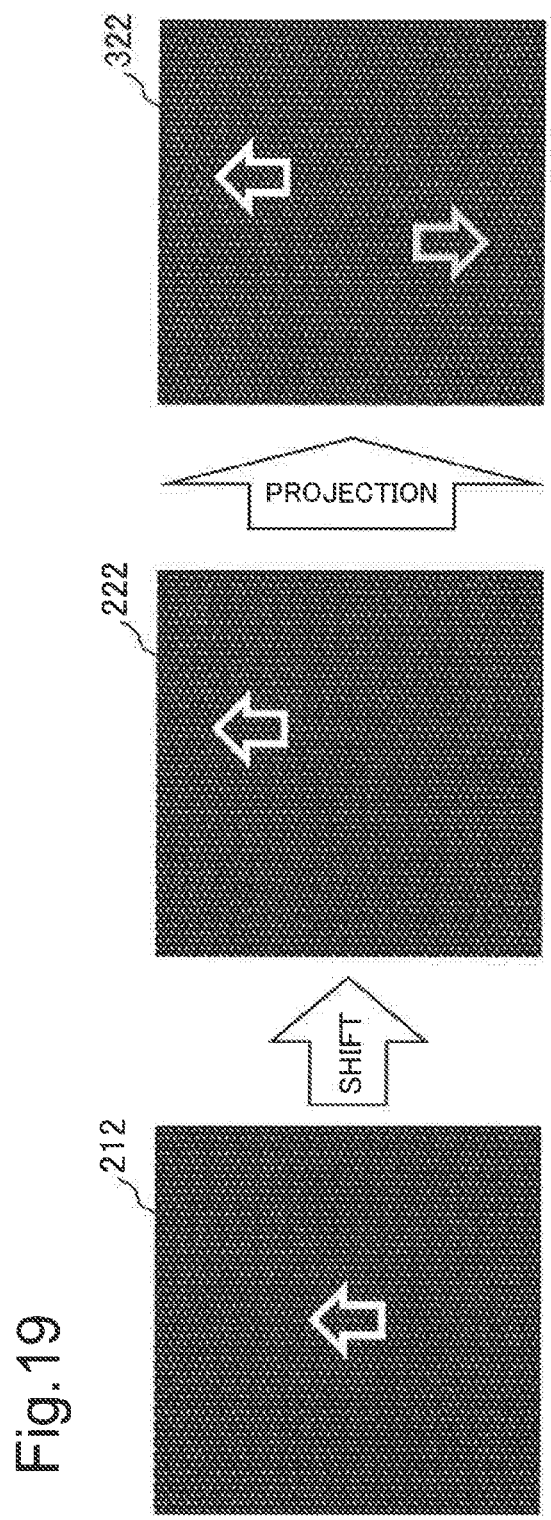
FIG. 19 is a conceptual diagram illustrating one example in which a ghost appears when shift processing is performed on an image.

FIG. 19 is a conceptual diagram illustrating how an image projected without using a ghost compensation image is visually recognized on a projection surface. FIG. 19 illustrates an example of projection by using a phase distribution of a shift image (hereinafter, referred to as a desired image 222) generated by performing shift processing on a base image 212. In the example in FIG. 19, a projection image 322 including a ghost is visually recognized on the projection surface.

Figure 20:
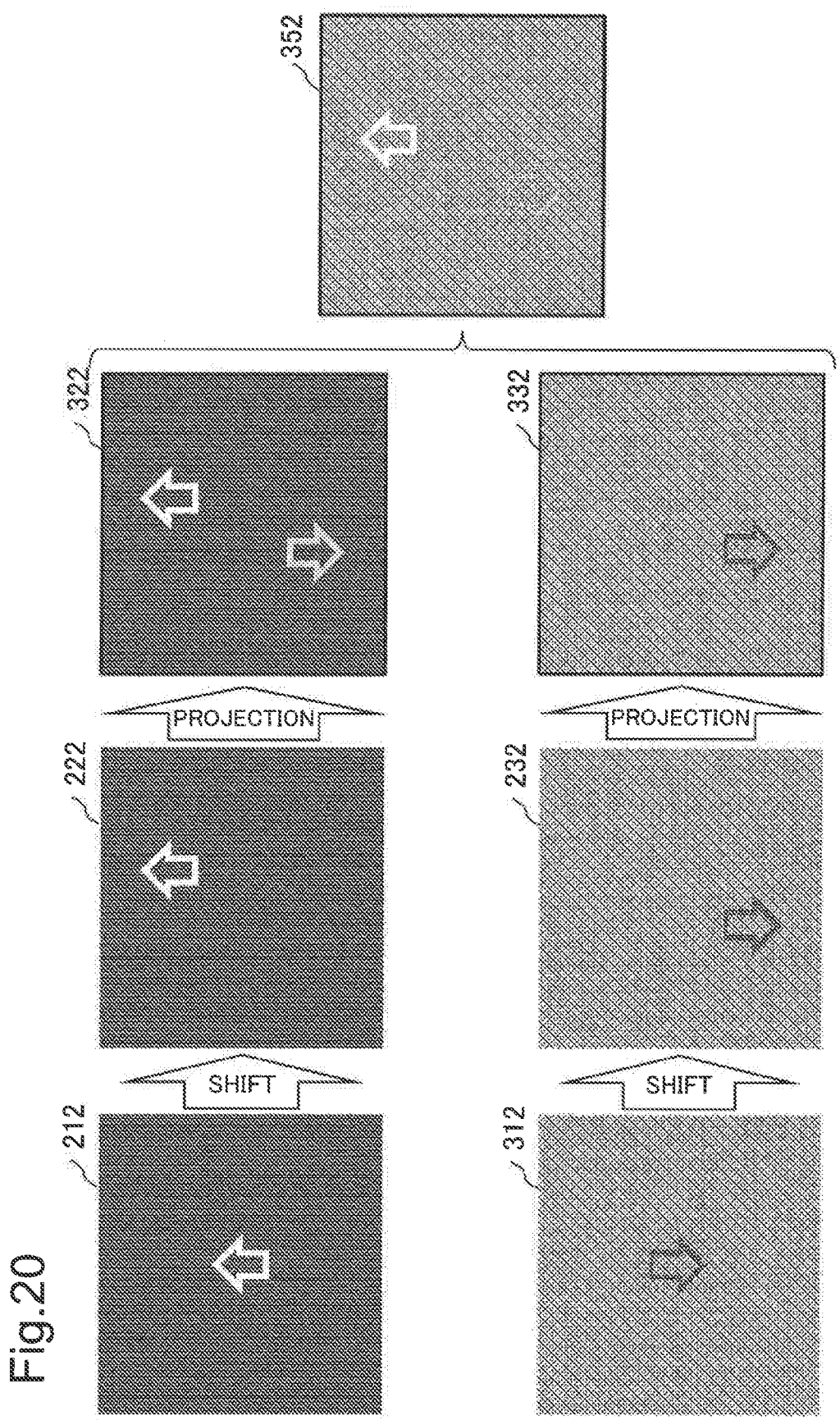
FIG. 20 is a conceptual diagram illustrating one example in which an image generated by the ghost compensation means included in the projection control means according to the third example embodiment of the present invention is projected.

FIG. 20 is a conceptual diagram illustrating how an image projected from the projection device according to the present example embodiment is visually recognized on the projection surface.

An upper part of FIG. 20 illustrates an example in which a desired image 222 is generated by performing shift processing on a base image 212 including display information, and the generated desired image 222 is projected. A lower part of FIG. 20 illustrates an example in which a ghost compensation image 232 for the base image 222 is generated by performing shift processing on a ghost compensation image 312 for the base image 212, and the generated ghost compensation image 232 for the desired image 222 is projected. In the example in FIG. 20, a projection image 322 formed on a projection surface by projecting the desired image 222 and a projection image 332 formed on the projection surface by projecting the ghost compensation image 232 are visually recognized as a viewing image 352 on the projection surface.

In the examples in FIG. 20, light is projected by using phase distributions of the desired image 222 and the ghost compensation image 232, without combining the desired image 222 including the ghost and the ghost compensation image 232. For example, a configuration can be made in which display regions of the display part of a spatial light modulation element 13 are allocated as a display region of the desired image 222 and a display region of the ghost compensation image 232, and the desired image 222 and the ghost compensation image 232 are projected simultaneously, so that a viewing image 352 is visually recognized on the projection surface. Further, for example, a configuration can be made in which the desired image 222 and the ghost compensation image 232 are alternatively displayed by switching phase distributions to be displayed on the display part of the spatial light modulation element 13 at high speed, so that the viewing image 352 is also visually recognized on the projection surface. Note that a configuration may be made in which the ghost compensation means 25 generates a phase distribution of a combined image of the desired image 222 and the ghost compensation image 232, and the projection device projects light by using the generated phase distribution of the combined image.

Images projected from the projection device may be not only still images but also moving images that are desired images dynamically shifted. When moving images are generated by using shift processing in the present example embodiment, ghost compensation images are formed, in addition to desired images, by setting a background level equivalent to a ghost level, flipping the desired images point-symmetrically, and reversing brightness. In the present example embodiment, a phase distribution of a ghost compensation image is generated from an image in which a shift image of a desired image is rotated 180 degrees about a center of the image, and a ghost is compensated by using the generated phase distribution.

As described above, the present example embodiment can compensate ghosts in dynamically generated images as well by using ghost compensation images for desired images generated by shift processing.

Fourth Example Embodiment

Figure 21:
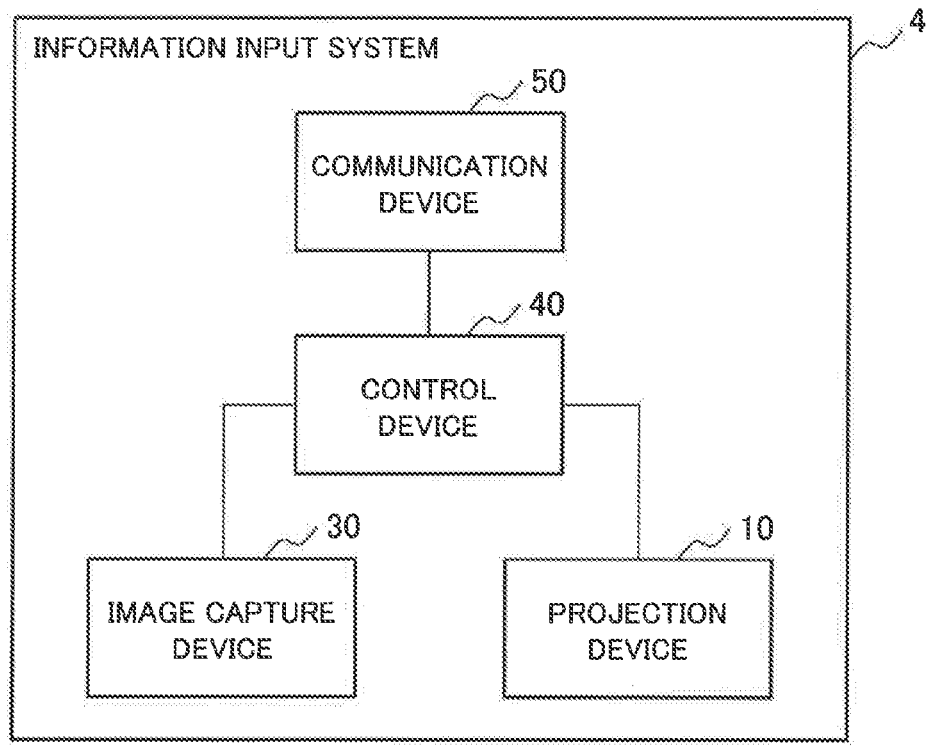
FIG. 21 is a block diagram illustrating a configuration of an information input system according to a fourth example embodiment of the present invention.

An information input system according to a fourth example embodiment of the present invention will be described next. FIG. 21 is a block diagram illustrating a configuration of an information input system 4 according to the present example embodiment. As illustrated in FIG. 21, the information input system 4 includes a projection device 10, an image capture device 30, a control device 40 and a communication device 50.

The projection device 10 is any one of the projection devices according to the first to third example embodiments of the present invention. The projection device 10 is connected to the control device 40, and operates in accordance with an instruction from the control device 40. For example, the projection device 10 projects an image including a user interface as display information on a projection surface.

The image capture device 30 is a camera for capturing an image of a projection surface. The image capture device 30 is connected to the control device 40, and operates according to control by the control device 40. For example, the image capture device 30 captures an image of a user interface displayed onto the projection surface and a user.

The control device 40 is a control system that issues a projection instruction to the projection device 10, and controls image capturing of the image capture device 30. The control device 40 is connected to the projection device 10, the image capture device 30, and the communication device 50. The control device 40 recognizes the content of an instruction to an input image displayed as a desired image on a projection surface by projection light from the projection device 10, by relating the input image to a positional relationship of an instructing entity with the input image. The control device 40 controls the projection device 10 in such a way as to cause the desired image corresponding to the recognized content of the instruction to be displayed on the projection surface. For example, the control device 40 analyzes the content of the instruction from a user by relating an image of a user interface (input image) captured by the image capture device 30 to the content of the instruction issued by a user to the user interface, and sends a projection instruction according to a result of the analysis to the projection device 10.

The communication device 50 has a communication function for communicating with an external system or an external device. The communication device 50 is connected to the external system or the external device, and the control device 40. The communication device 50 exchanges signals that are transmitted and received to and from the external system or the external device with the control device 40.

[Image Capture Device]

Figure 22:
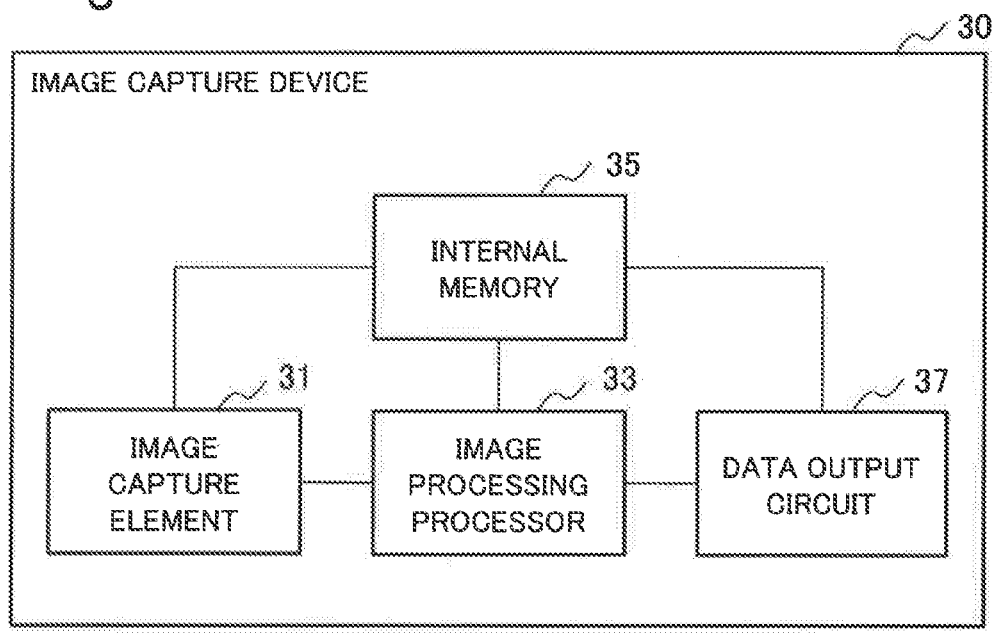
FIG. 22 is a block diagram illustrating a configuration of an image capture device included in the information input system according to the fourth example embodiment of the present invention.

The image capture device 30 of the information input system 4 will be described next with reference to a drawing. FIG. 22 is a block diagram illustrating a configuration of the image capture device 30. The image capture device 30 includes an image capture element 31, an image processing processor 33, an internal memory 35, and a data output circuit 37. The image capture device includes a function of a typical digital camera.

The image capture element 31 is an element for capturing a predetermined image capture region, and acquiring image capture data of the image capture region. In the present example embodiment, a region including a projection range is set as the image capture region.

The image capture element 31 is a photoelectric conversion element including a semiconductor integrated circuit. For example, the image capture element 31 can be implemented by a solid-state image capture element such as a charge-coupled device (CCD) or a complementary metal-oxide-semiconductor (CMOS). While the image capture element 31 is typically constituted of elements that capture an image of light in the visible range, the image capture element 31 may be constituted of elements that are capable of capturing an image of or detecting an infrared-ray, an ultraviolet-ray, an X-ray, a gamma-ray, a radio wave, a microwave, or the like.

The image processing processor 33 is an integrated circuit that generates image data by performing image processing, such as dark current correction, interpolation operation, color space conversion, gamma correction, aberration correction, noise reduction, and image compression, on image capture data captured by the image capture element 31. Note that when image capture data is used without processing, the image processing processor 33 may be omitted.

The internal memory 35 is a storage element that temporarily stores excess image information that cannot be processed during image processing by the image processing processor 33 and processed image information. Note that a configuration may be made in which image information captured by the image capture element 31 is temporarily stored in the internal memory 35. The internal memory 35 may be constituted of a generic memory.

The data output circuit 37 outputs image data processed by the image processing processor 33 to the control device 40.

[Control Device]

Figure 23:
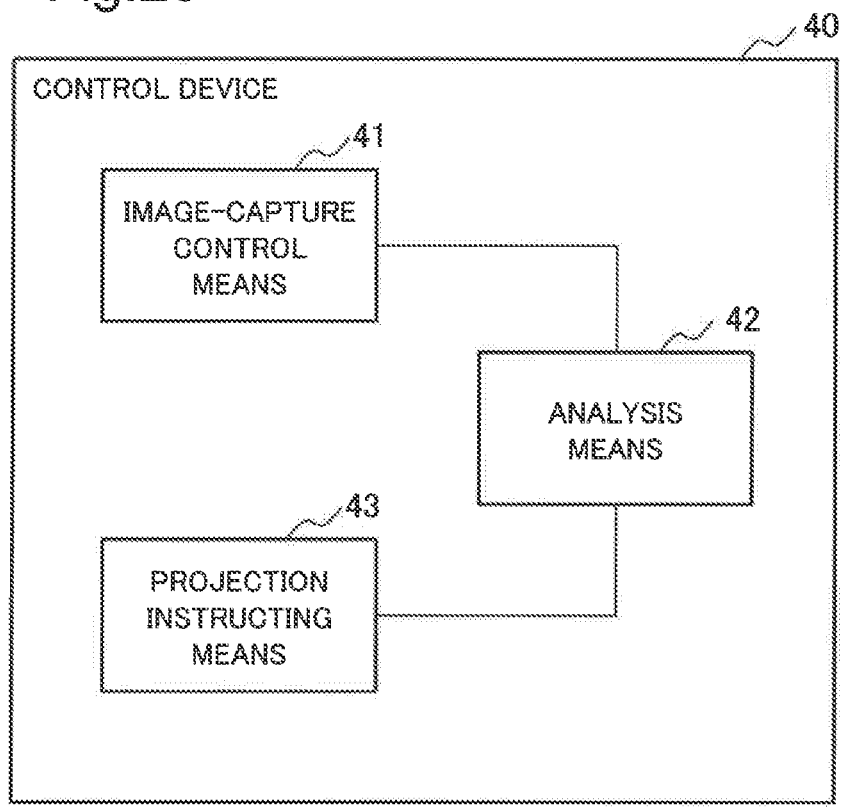
FIG. 23 is a block diagram illustrating a configuration of a control device included in the information input system according to the fourth example embodiment of the present invention.

A detailed configuration of the control device 40 provided in the information input system 4 will be described with reference to a drawing. FIG. 23 is a block diagram illustrating a configuration of the control device 40. As illustrated in FIG. 23, the control device 40 includes an image-capture control means 41, an analysis means 42, and a projection instructing means 43.

The image-capture control means 41 controls the image capture device 30 to cause the image capture device 30 to capture an image of a projection range, and acquires image data in the projection range. The image-capture control means 41 outputs the acquired image data to the analysis means 42.

The analysis means 42 acquires the image data of the projection range from the image-capture control means 41, and analyzes information for relating a position in which an instructing entity such a finger of a user is detected, by using the acquired image data and a displayed user interface. The analysis means 42 outputs a result of the analysis to the communication device 50. The analysis means 42 also outputs a projection instruction signal including an instruction to cause the projection device 10 to perform projection to the projection instructing means 43.

The analysis means 42 may be configured to detect only an operation position, and determine a content of operation that corresponds to the detected operation position by an external upper system. Further, a configuration may be made in which the analysis means 42 holds information indicating a content of operations to be related to operation positions in a tabular form or a list form, and the analysis means 42 itself determines a content of operation that corresponds to an operation position when the operation position is identified.

The projection instructing means 43 outputs a projection instruction signal to the projection device 10 in response to a projection instruction from the analysis means 42. Note that a configuration may be made in which the projection control means 20 of the projection device 10 is included in the control device 40, and the projection device 10 is controlled from the control device 40.

As described above, in the information input system according to the present example embodiment, an image of a content of operation performed by a user on the user interface projected from the projection device is captured by the image capture device, and the captured image data is analyzed by the control device. Then, the information input system according to the present example embodiment causes image data according to a result of the analysis to be displayed on the projection surface. The information input system according to the present example embodiment thus enables an interactive operation.

(Hardware)

A hardware configuration that implements a control system of the projection device according to the present example embodiments will be described by taking a computer 90 in FIG. 24 as one example. Note that the computer 90 in FIG. 24 is an exemplary configuration for implementing the projection device according to each example embodiment, and is not intended to limit the scope of the present invention.

Figure 24:
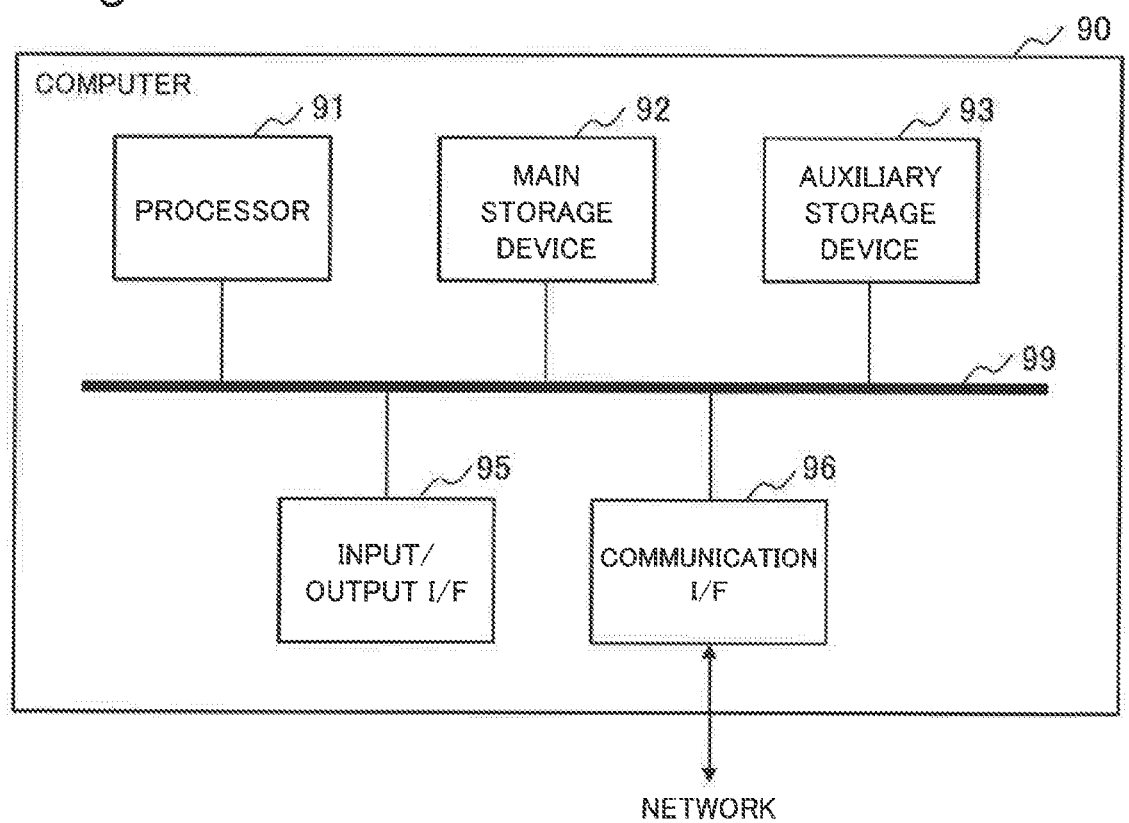
FIG. 24 is a block diagram illustrating one example of a hardware configuration for implementing a control system of each example embodiment of the present invention.

As illustrated in FIG. 24, the computer 90 includes a processor 91, a main storage device 92, an auxiliary storage device 93, an input/output interface 95, and a communication interface 96. In FIG. 24, the interfaces are abbreviated as I/F. The processor 91, the main storage device 92, the auxiliary storage device 93, the input/output interface 95, and the communication interface 96 are connected through a bus 99 in such a way that they can exchange data with one another. Further, the processor 91, the main storage device 92, the auxiliary storage device 93, and the input/output interface 95 are connected to a network such as the Internet or an intranet through the communication interface 96. The computer 90 is connected to an upper system through the network, and acquires information such as a phase distribution of an image to be projected from an upper system and outputs a result of input to an outside.

The processor 91 loads a program stored in the auxiliary storage device 93 or the like into the main storage device 92, and executes the loaded program. In the present example embodiment, a configuration may be made in which a software program installed on the computer 90 is used. The processor 91 executes computational processing and control processing to be performed by the control device according to the present example embodiment.

The main storage device 92 includes a region in which a program is loaded. The main storage device 92 may be a volatile memory such as a dynamic random access memory (DRAM), for example. Further, a non-volatile memory such as a magnetoresistive random access memory (MRAM) may be configured and added as the main storage device 92.

The auxiliary storage device 93 is a means for storing data such as a phase distribution of an image. The auxiliary storage device 93 is configured by a local disk such as a hard disk or a flash memory. Note that a configuration is made in which a phase distribution of an image is stored in the main storage device 92, and the auxiliary storage device 93 can be omitted.

The input/output interface 95 is a device that connects the computer 90 with peripheral equipment, based on a connection standard for connecting the computer 90 with peripheral equipment. The communication interface 96 is an interface for connecting to a network such as the Internet or an intranet, based on a standard or specifications. The input/output interface 95 and the communication interface 96 may be integrated as a common interface that connects to external equipment.

The computer 90 may be configured in such a way that input equipment such as a keyboard, a mouse, and a touch panel can be connected to the computer 90 as required. The input equipment are used for inputting information and settings. Note that when a touch panel is used as input equipment, the touch panel may be configured in such a way that the display screen of display equipment also serves as an interface for the input equipment. Data exchange between the processor 91 and the input equipment should be intermediated by the input/output interface 95.

The communication interface 96 is connected to a system or a device such as another computer or a server through a network.

Further, the computer 90 may be provided with display equipment for displaying information. When display equipment is provided, a display controller (not depicted) for controlling display by the display equipment is preferably provided in the computer 90. The display equipment should be connected to the computer 90 through the input/output interface 95.

Further, the computer 90 may be provided with a reader/writer as required. The reader/writer is connected to the bus 99. The reader/writer intermediates, with a recoding medium (program recording medium) not depicted, reading of data/a program from a recording medium, and writing of results of processing by the computer 90 into the recording medium. The recording medium can be implemented by a semiconductor recoding medium and the like such as a secure digital (SD) card or a universal serial bus (USB) memory. The recording medium may also be implemented by a magnetic recording medium such as a flexible disk, an optical recording medium such as a compact disc (CD) or a digital versatile disc (DVD), or another recording medium.

The foregoing is one example of a hardware configuration for enabling the projection device according to the example embodiment of the present invention. Note that the hardware configuration in FIG. 24 is one exemplary hardware configuration for enabling the projection method according to each example embodiment of the present invention, and is not intended to limit the scope of the present invention. Further, a program that causes a computer to execute processing according to the present example embodiment also falls within the scope of the present invention. Moreover, a program recording medium on which a program according to the example embodiment of the present invention is recorded also falls within the scope of the present invention.

REFERENCE SIGNS LIST

1 Projection device
4 Information input system
10 Projection device
11 Light source
12 Light-source driving means
13 Spatial light modulation element
14 Modulation element control means
15 Projection optical system
20 Projection control means
21 Communication means
22 Image selecting means
23 Storage means
24 Projection condition setting means
25 Ghost compensation means
26 Shift processing means
30 Image capture device
31 Image capture element
33 Image processing processor
35 Internal memory
37 Data output circuit
40 Control device
41 Image-capture control means
42 Analysis means
43 Projection instructing means
50 Communication device
151 Fourier transform lens
152 Aperture
153 Projection lens
251 Image acquisition means
252 Image conversion means
253 Ghost brightness estimation means
254 Brightness setting means
255 Phase distribution generation means

The invention claimed is:
1. A projection device comprising:
a light source;
a light-source driver configured to drive the light source;
a spatial light modulation element that reflects light from the light source by a display part;
a modulation element controller configured to cause a phase distribution of an image being projected onto a projection surface to be displayed on the display part;
a projection controller configured to control the light source driver and the modulation element controller; and a projection optical system that projects light reflected by the display part toward the projection surface, wherein the projection controller controls the light source driver and the modulation element controller in such a way as to cause a phase distribution of an image including a ghost compensation image and a desired image to be displayed on the display part, the ghost compensation image being an image for which high brightness is set totally and in which a display information portion to be displayed on the projection surface is bright while a ghost image portion that appears in association with the display information is dark.

2. The projection device according to claim 1, wherein the ghost compensation image is an image in which, when the desired image is projected onto the projection surface, brightness of a background portion of a rotated image resulting from rotating the desired image 180 degrees is set according to an estimate value of brightness of a ghost image that appears in association with the display information included in the desired image, and brightness of a portion associated with the ghost image in the rotated image is set lower than the brightness of a background portion of the rotated image.

3. The projection device according to claim 1, wherein the projection controller outputs a projection condition for causing a phase distribution of the ghost compensation image to be displayed on a display part of the spatial light modulation element, to the light source driver and the modulation element controller, the ghost compensation image including a first region that is set around the display information and a second region that is set around the ghost image and brightness of which is adjusted according to an estimate value of brightness of the ghost image.

4. The projection device according to claim 3, wherein the projection controller outputs the projection condition for causing a phase distribution of the ghost compensation image in which brightness of a boundary region between the first region and the second region gradually changes to be displayed on a display part of the spatial light modulation element, to the light source driver and the modulation element controller.

5. The projection device according to claim 1, wherein the projection controller includes:
a communication circuit configured to receive information relating to the desired image to be displayed on the projection surface;
an image selecting circuit configured to select a phase distribution of the ghost compensation image associated with the desired image to be displayed on the projection surface;
a storage circuit configured to store a phase distribution of the ghost compensation image associated with the desired image; and
a projection condition setting circuit configured to output a projection condition for causing phase distributions of the desired image and the ghost compensation image that are selected by the image selecting circuit to be displayed on a display part of the spatial light modulation element, to the light source driver and the modulation element controller.

6. The projection device according to claim 1, wherein the projection controller includes a ghost compensation circuit, the ghost compensation circuit including:

the image acquisition circuit for acquiring the desired image including the display information to be displayed on the projection surface, from the image selecting circuit;
an image conversion circuit for generating the rotated image acquired by rotating the desired image 180 degrees;
a ghost brightness estimation circuit for estimating brightness of the ghost image, based on brightness set for the display information; and
a brightness setting circuit for acquiring the rotated image converted by the image conversion circuit, and setting brightness for a background portion around a ghost image of the acquired rotated image, based on the brightness of the ghost image estimated by the ghost brightness estimation circuit.

7. The projection device according to claim 5, wherein the projection controller includes a shift processing circuit configured to perform shift processing on the desired image selected by the image selecting circuit, and the ghost compensation circuit generates the ghost compensation image that compensates the ghost image included in the desired image on which shift processing is performed by the shift processing circuit.

8. An information input system comprising:
the projection device according to claim 1;
an image capture device that captures an image of a range including the projection surface;
a control device that controls the projection device and the image capture device; and
a communication device that communicates with an outside, wherein
the control device recognizes a content of an instruction to an input image displayed as the desired image on the projection surface by projection light from the projection device, by associating the input image with a positional relationship of an instructing entity for the input image, and controls the projection device in such a way as to cause the desired image associated with the recognized content of the instruction to be displayed on the projection surface.

9. A projection method that uses a phase-modulating spatial light modulation element, the projection method comprising:
when a desired image is displayed on a projection surface, causing a phase distribution of an image including a ghost compensation image and the desired image to be displayed on a display part, the ghost compensation image being an image for which high brightness is set totally and in which a display information portion to be displayed on the projection surface is bright while a ghost image portion that appears in association with the display information is dark;
causing light from a light source to be reflected by a display part of the spatial light modulation element; and
projecting light reflected by a display part of the spatial light modulation element toward the projection surface.

10. A non-transitory program recording medium on which a program that uses a phase-modulating spatial light modulation element is recorded, the program causing a computer to execute:
processing of, when a desired image is displayed on a projection surface, causing a phase distribution of an image including a ghost compensation image and the desired image to be displayed on a display part, the ghost compensation image being an image for which high brightness is set totally and in which a display information portion to be displayed on the projection surface is bright while a ghost image portion that appears in association with the display information is dark;

processing of causing light from a light source to be reflected by a display part of the spatial light modulation element; and processing of projecting light reflected by a display part of the spatial light modulation element toward the projection surface.

* * * * *